(12) United States Patent  
Ueno et al.

(10) Patent No.: US 8,165,747 B2  
(45) Date of Patent: Apr. 24, 2012

(54) PEDAL SYSTEM AND VEHICLE WITH THE PEDAL SYSTEM

(75) Inventors: Kentaro Ueno, Atsugi (JP); Mitsuhide Sasaki, Isehara (JP)

(73) Assignee: Hitachi, Ltd., Tokyo (JP)

( * ) Notice: Subject to any disclaimer, the term of this patent is extended or adjusted under 35 U.S.C. 154(b) by 1448 days.

(21) Appl. No.: 11/356,282

(22) Filed: Feb. 17, 2006

(65) Prior Publication Data

US 2006/0231074 A1    Oct. 19, 2006

(30) Foreign Application Priority Data

Mar. 31, 2005    (JP) ................................. 2005-100360

(51) Int. Cl.  
*G06F 7/00* (2006.01)

(52) U.S. Cl. ................ 701/36; 701/70; 74/512; 74/513; 74/516; 74/560

(58) Field of Classification Search .................... 701/70, 701/36; 303/113.4, 114.1, 15, 3; 84/626; 74/512, 513, 516, 560  
See application file for complete search history.

(56) References Cited

U.S. PATENT DOCUMENTS

| | | | |
|---|---|---|---|
| 6,315,371 B1 | 11/2001 | Wachi et al. | |
| 6,471,304 B1 | 10/2002 | Deml et al. | |
| 7,425,042 B2 * | 9/2008 | Fujiwara et al. | 303/114.1 |
| 7,715,969 B2 * | 5/2010 | Yamamura | 701/70 |
| 2002/0161487 A1 * | 10/2002 | Kojima et al. | 701/1 |
| 2003/0060936 A1 * | 3/2003 | Yamamura et al. | 701/1 |
| 2004/0040408 A1 * | 3/2004 | Shaw et al. | 74/560 |
| 2004/0059482 A1 * | 3/2004 | Hijikata | 701/36 |
| 2010/0204883 A1 * | 8/2010 | Honda | 701/36 |

FOREIGN PATENT DOCUMENTS

| | | |
|---|---|---|
| DE | 198 32 036 A1 | 1/1999 |
| DE | 198 16 024 A1 | 5/1999 |
| EP | 1 253 053 A2 | 10/2002 |
| JP | 11-291894 A | 10/1999 |

OTHER PUBLICATIONS

Extended European Search Report dated Aug. 3, 2006 (Six (6) pages).

* cited by examiner

*Primary Examiner* — Jack W Keith  
*Assistant Examiner* — Rami Khatib  
(74) *Attorney, Agent, or Firm* — Crowell & Moring LLP

(57) ABSTRACT

For a pedal travel, a pedal reaction force, a driving force of a vehicle, and a braking force of a vehicle, different characteristics conformed to a stepping motion, a releasing motion, and a holding motion are determined on the basis of a pedal effort and predetermined characteristics of a pedal reaction force, and characteristics in a holding motion are changed according to vehicle information and environmental information.

38 Claims, 21 Drawing Sheets

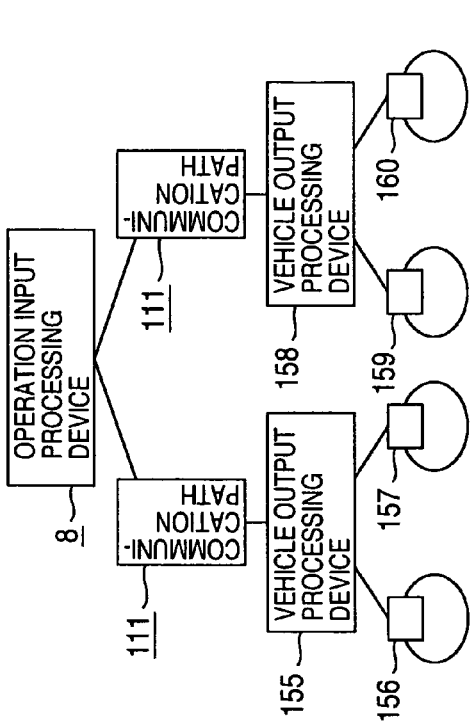
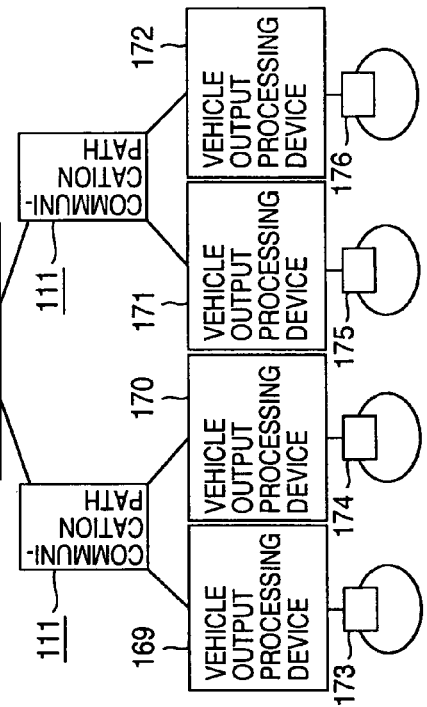
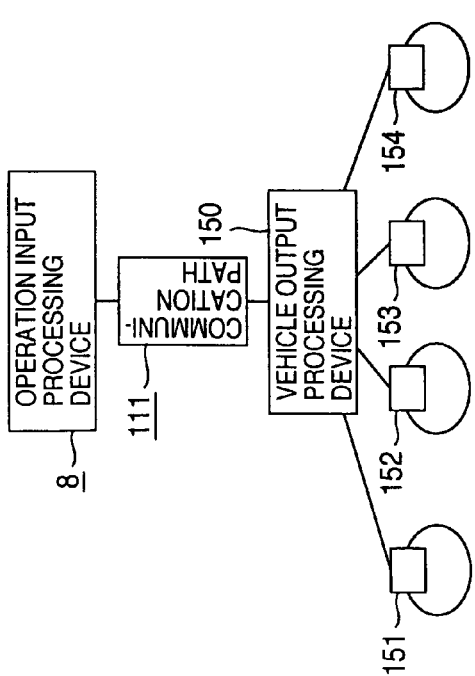
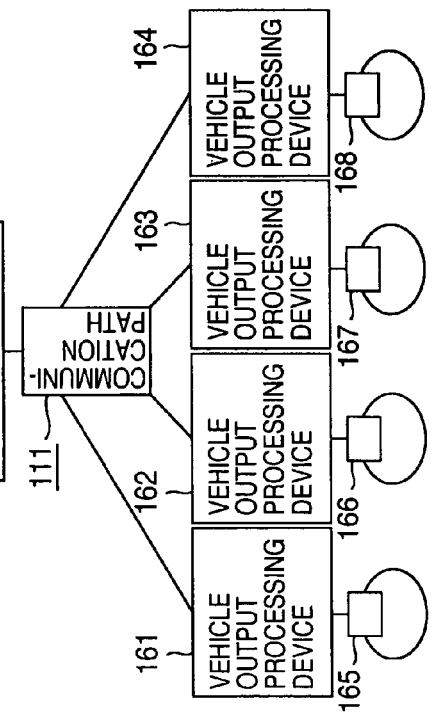

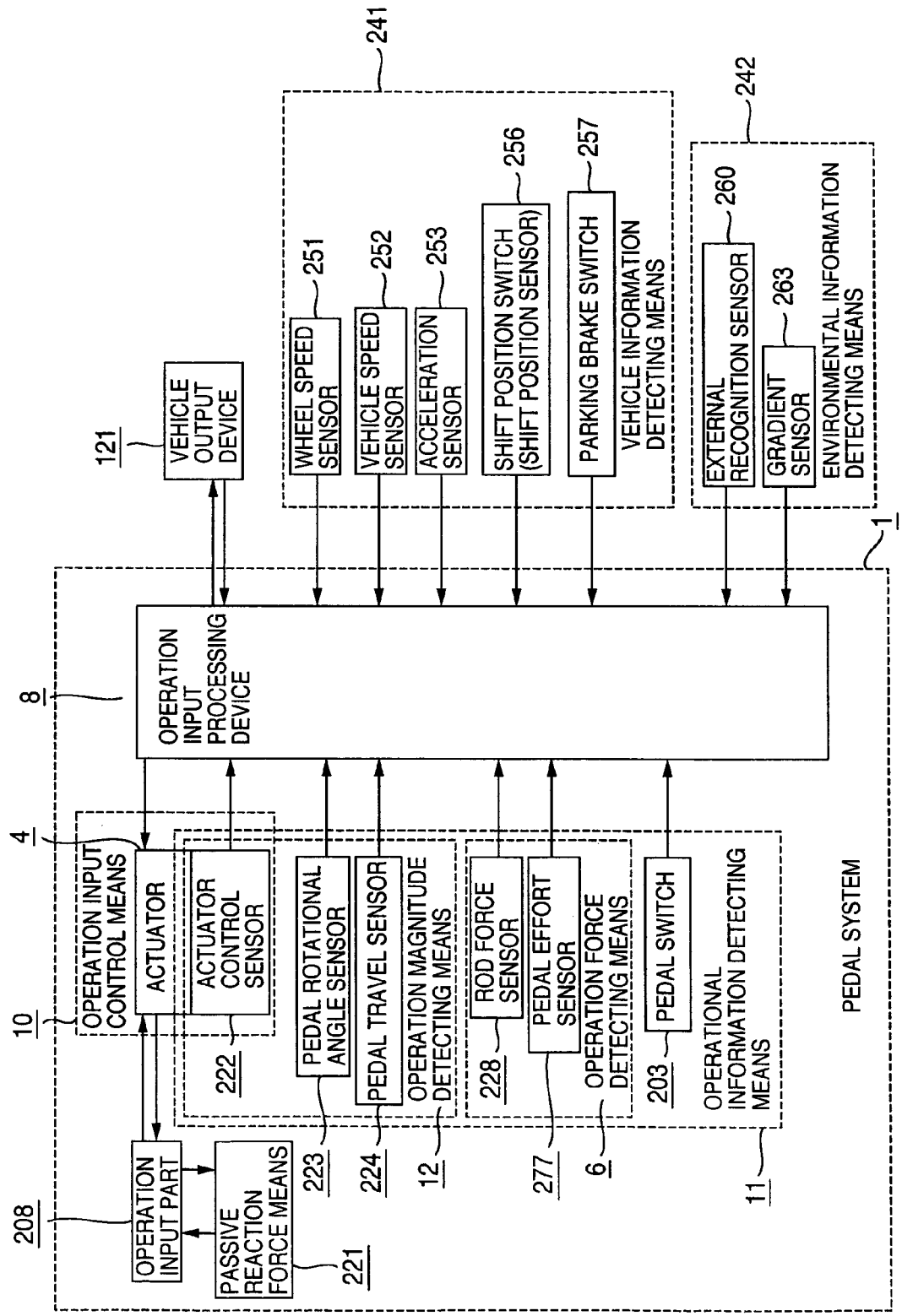

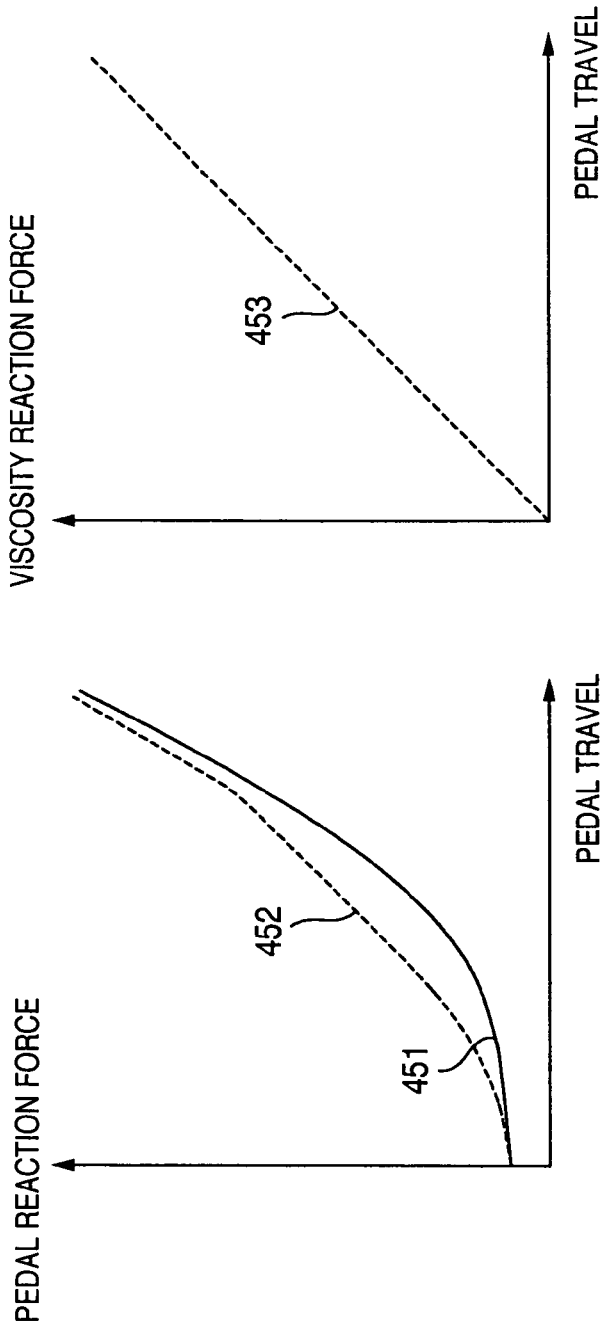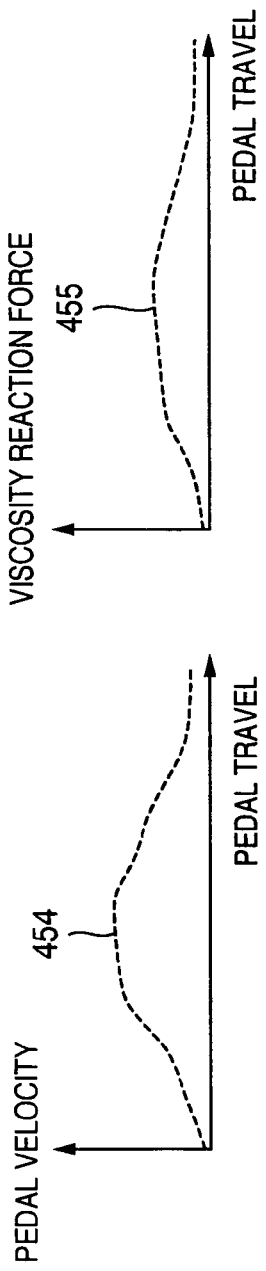

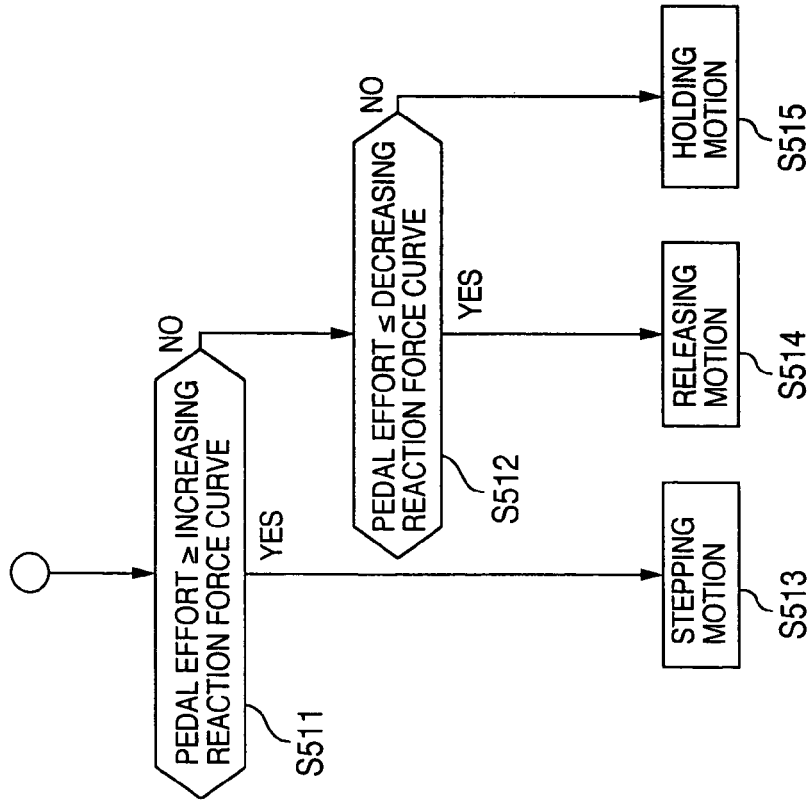
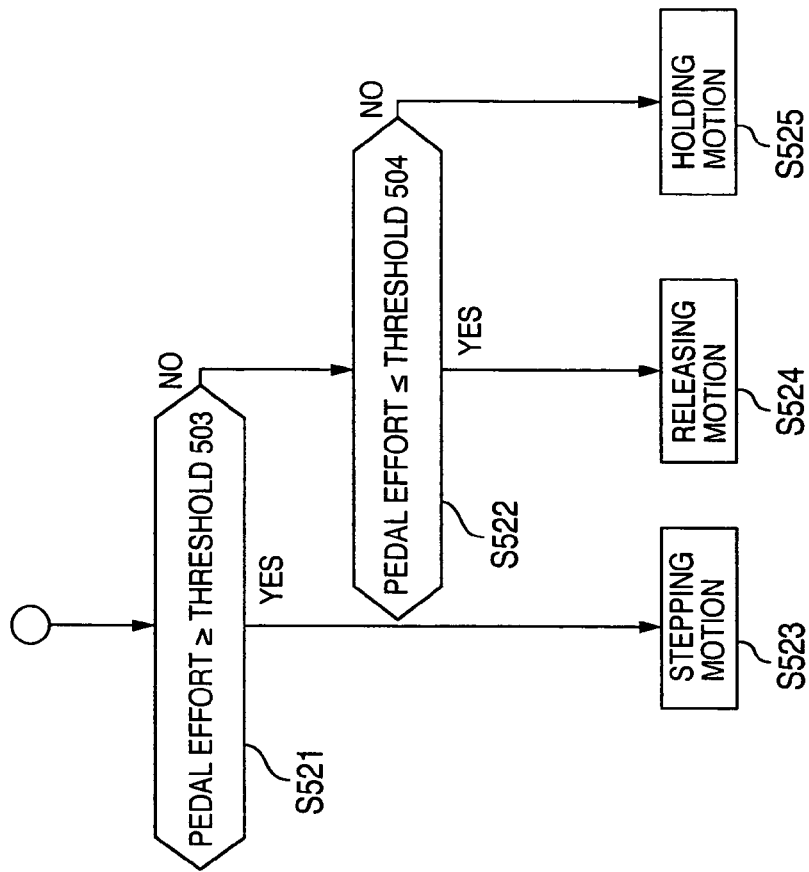

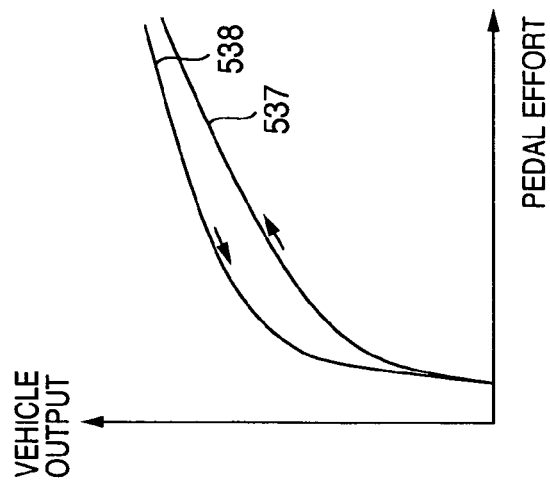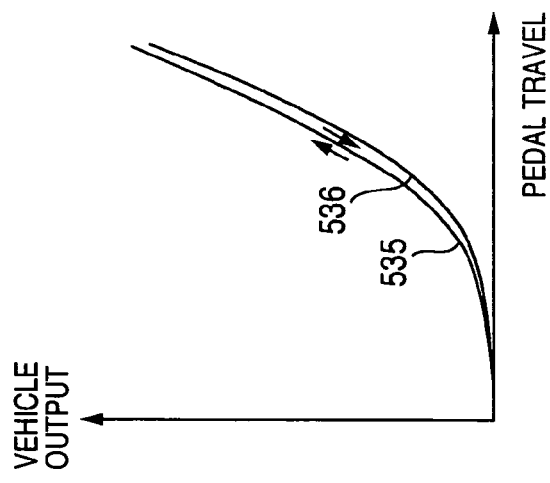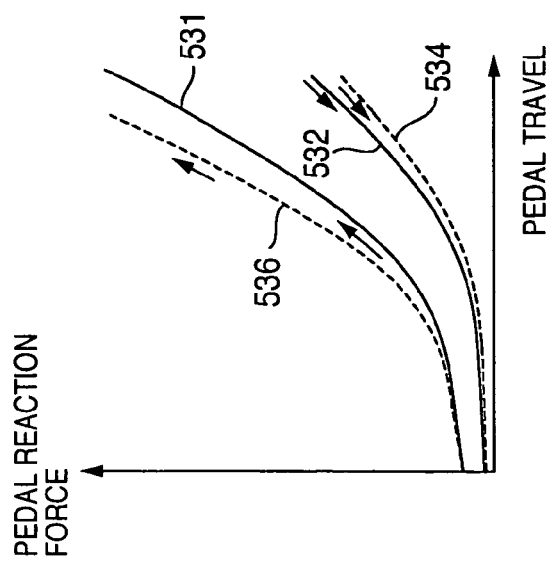

PEDAL SYSTEM AND VEHICLE WITH THE PEDAL SYSTEM

BACKGROUND OF THE INVENTION

The present invention relates to a pedal system capable of electrically controlling a pedal travel or a pedal reaction force or a vehicle output, and a vehicle provided with the pedal system.

Conventionally, a driving force and a braking force of a vehicle are operatively manipulated by a pedal. Stepping on a pedal, a driver physically feels an inertial force generated by acceleration and deceleration of a vehicle as well as a pedal reaction force. Therefore, properties such as a pedal travel, a pedal reaction force, a driving force and a braking force of a vehicle, etc. constitute factors that determine a feeling of driving, easiness of operation, susceptibility to fatigue, etc.

On the other hand, since a conventional pedal is mechanically connected to an accelerator wire and a master cylinder, characteristics of the pedal is uniquely determined by the mechanism.

In recent years, however, a technique, so-called bi-wire, makes it possible to arbitrarily set the relationship among a pedal travel, or a pedal reaction force, or a driving force and a braking force of a vehicle, and examination has been repeated on how the relationship among the pedal travel, or the pedal reaction force, or the driving force and the braking force of the vehicle should be controlled.

There is known a technique that varies pedal travel characteristics, braking force characteristics, and pedal effort characteristics according to, for example, an operating direction of a braking force and an operating direction of a brake pedal. (See JP-A-11-291894)

In a pedal system capable of arbitrarily setting a pedal travel and a pedal reaction force, an operating direction of a pedal is determined on the basis of balance of stepping by a driver with a force, which is generated by the pedal system. That is, there is caused a problem that since an operating direction of a pedal is resulted from control on the pedal system, delay occurs in reaction of the pedal relative to a pedal manipulation by a driver if the pedal system is controlled on the basis of the operating direction of the pedal, and stepping and releasing motions intended by the driver does not necessarily correspond to an actual operating direction, thus bringing about a sense of incongruity.

Reference is made in the conventional technique to the case where a driver performs a stepping motion and the case where a driver performs a releasing motion. However, there is caused a problem that consideration is not adequately given to a holding motion in the case where stepping on a pedal is maintained constant.

SUMMARY OF THE INVENTION

In order to solve the above-described problems, the invention determines, with respect to a pedal travel, a pedal reaction force, a driving force and a braking force of a vehicle, different characteristics conformed to a stepping motion, a releasing motion, and a holding motion on the basis of a pedal effort and a predetermined reaction force curve. Characteristics in a holding motion is changed according to vehicle information and environmental information.

According to the invention, it is possible to provide a pedal system, which can vary characteristics of a pedal and vehicle movement as intended by a driver according to a stepping motion, a releasing motion, and a holding motion, and which does not give a sense of incongruity to a driver, and which is easy to operate and hard to bring about susceptibility to fatigue, and gives easiness of operation, non-susceptibility to fatigue, and a good feeling of driving.

Other objects, features and advantages of the invention will become apparent from the following description of the embodiments of the invention taken in conjunction with the accompanying drawings.

BRIEF DESCRIPTION OF THE DRAWINGS

FIGS. 3a-3d are schematic views showing an example of the structure of an operation input processing device, a vehicle output processing device, and a communication path.

FIG. 6 is a block diagram showing an example of a pedal system.

FIGS. 9a-9b are graphs illustrating an example of characteristics of a pedal reaction force.

FIGS. 12a and 12b are flowcharts showing an example of a method of judging a stepping motion, a releasing motion, and a holding motion.

FIGS. 13a-13c are graphs illustrating an example of characteristics of a pedal travel, a pedal reaction force, and a vehicle output.

DETAILED DESCRIPTION OF THE INVENTION

A vehicle operation control apparatus according to the invention has a mechanical and electrical construction that enables detecting a pedal travel and a pedal effort and electrically controlling an actuator, realizes a pedal travel corresponding to a pedal effort, generates a pedal reaction force corresponding to a pedal travel, and generates a braking force and a driving force on the basis of a pedal travel and a pedal effort.

A main construction of an embodiment, to which the invention is applied, will be described below with reference to the drawings.

Figure 1:
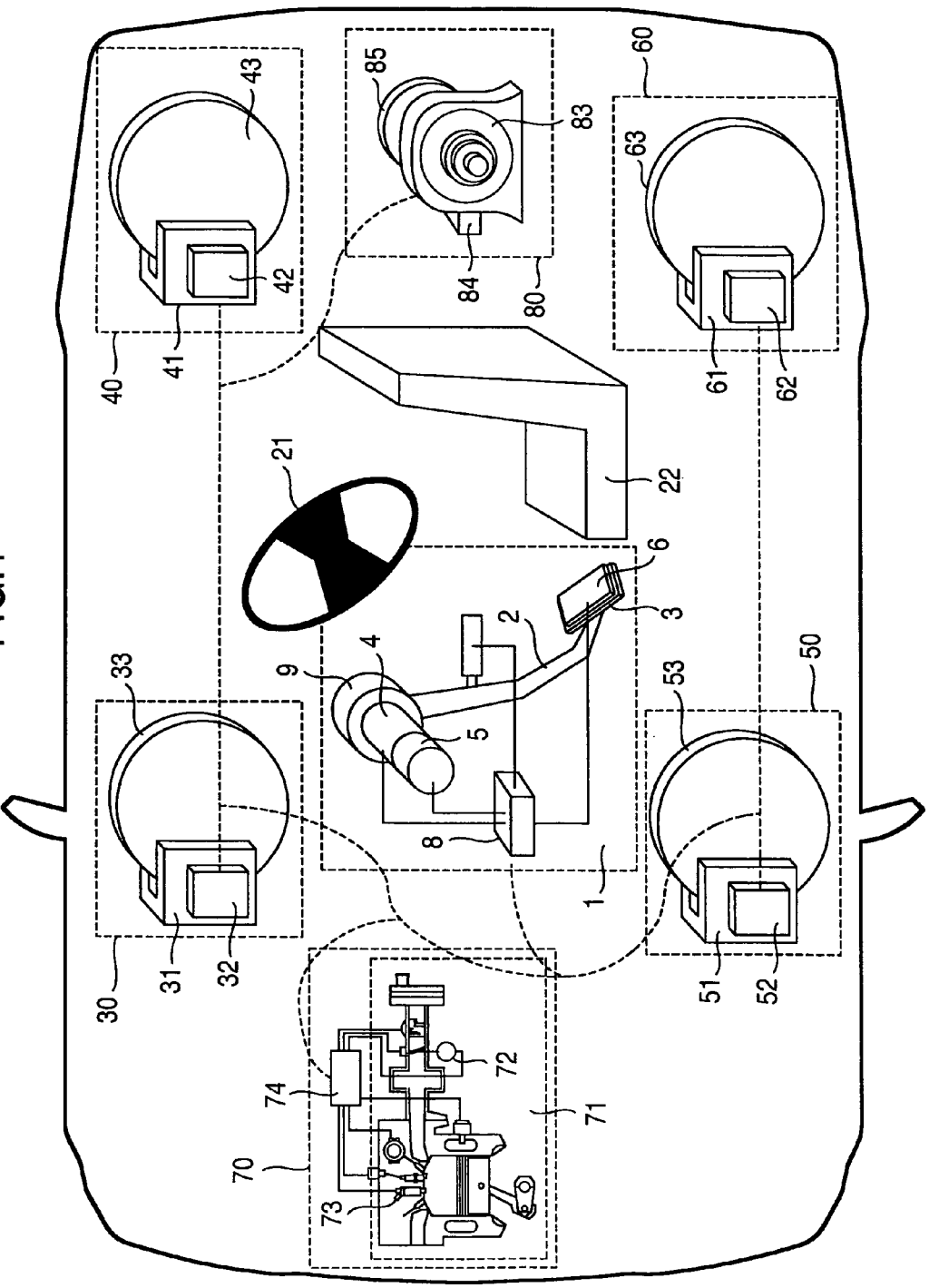
FIG. 1 is a schematic view of a system showing an example a structure of an embodiment 1.
Figure 2:
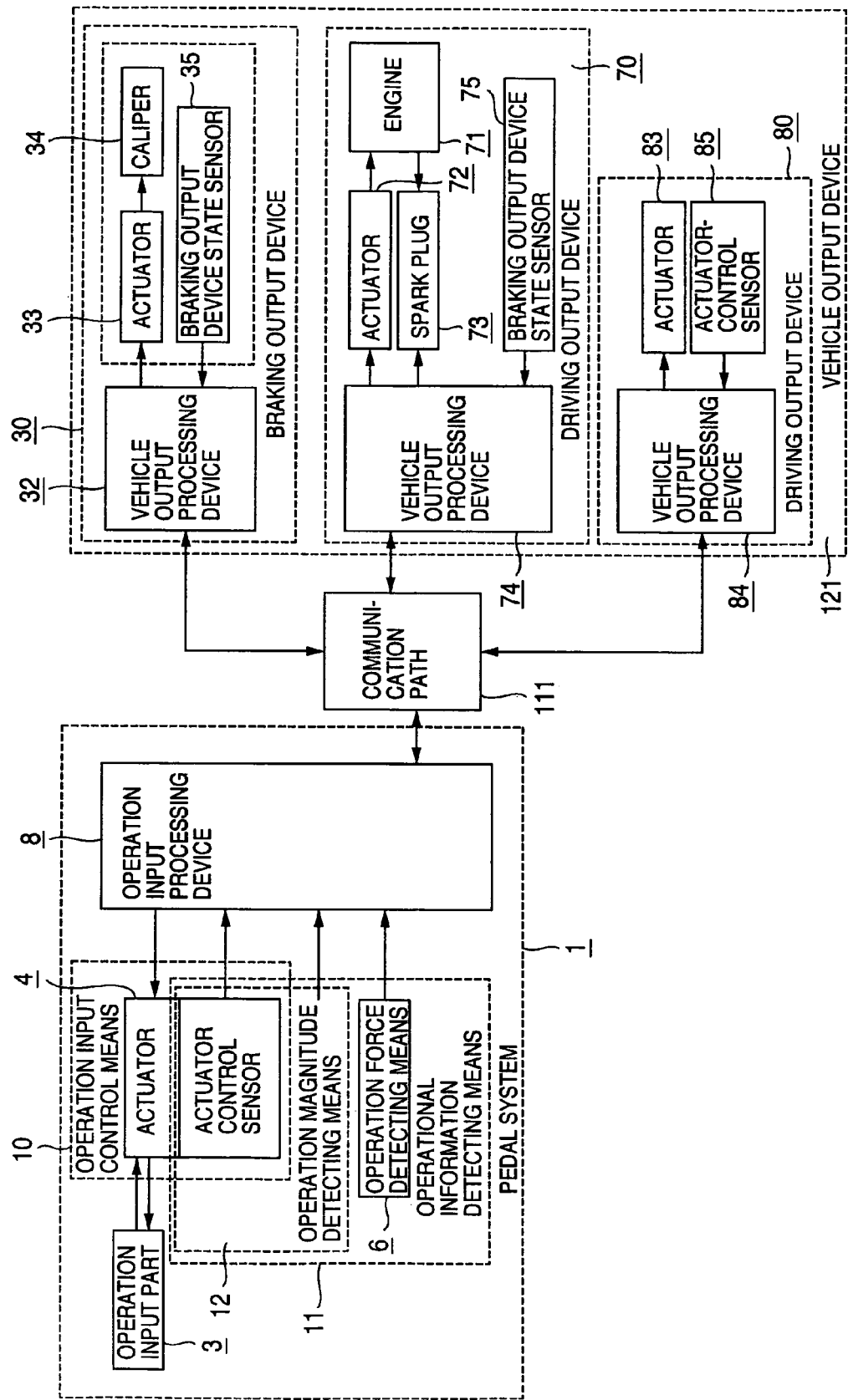
FIG. 2 is a block diagram of the system showing an example of the structure of the embodiment 1.

FIG. 1 is a schematic view showing a system that constitutes the invention. FIG. 2 is a block diagram of the system that constitutes the invention.

The reference numeral 1 denotes a pedal system, which a driver manipulates in order to operate a vehicle. With the pedal system 1, a pedal effort generated upon stepping by a driver varies a pedal travel and a pedal velocity in predetermined ranges. The pedal system 1 performs curvilinear or linear movements restricted in a predetermined range to a pedal effort.

Here, all inputs, which a driver feeds to the pedal system, are defined as an operation input. The operation input includes a pedal effort, a pedal travel, a pedal velocity, or information as to whether a pedal is stepped.

With the pedal system 1, a pedal travel is varied corresponding to a pedal effort. A pedal reaction force is generated corresponding to a pedal travel. Alternatively, a pedal reaction force is generated corresponding to a pedal effort and a feeling of manipulation of a pedal is given to a driver. The feeling of manipulation of a pedal generally has a great influence on a feeling of driving of a vehicle.

In the pedal system 1, the relationship among a pedal travel and a pedal reaction force, or a pedal effort can be arbitrarily set by electrical control. Here, a pedal travel corresponds to that magnitude, by which a pedal is stepped or manipulated. A pedal travel may be expressed as a pedal stroke or simply as a stroke. A pedal velocity corresponds to that velocity or that manipulating velocity, at which a pedal is stepped or released. A pedal velocity may be expressed as a pedal stroke velocity or simply as a stroke velocity. A pedal velocity is a displacement magnitude of a pedal travel in time unit, or a value found by differentiating a pedal travel by time, and can be found through calculation from a pedal travel. A pedal effort is a force, which a driver applies in order to move the pedal system, and generally corresponds to a force of stepping or a force of manipulation by foot. A pedal reaction force is that force, which the pedal system applies to a driver when the driver manipulates a pedal, and corresponds to a reaction force of manipulation. A pedal reaction force may be expressed simply as a reaction force. A pedal reaction force is a force paired with a pedal effort, and is generally a force opposed to a pedal effort. In particular, when a pedal is not moved in a state of being stepped, or a pedal is not accelerated in movement, a pedal effort and a pedal reaction force balance with each other, and are substantially equivalent to each other. Accordingly, when a pedal reaction force attains a certain value, it can be said that a pedal effort assumes the same value, and vice versa.

The reference numerals 30, 40, 50, 60, 70, 80 denote vehicle output devices that vary movements of a vehicle. A vehicle shown in FIGS. 1 and 2 results from an application of the bi-wire technique. In particular, a combination of the vehicle output devices 30, 40, 50, 60, 70, 80 with the pedal system 1 results from an application of the brake bi-wire technique, and a pedal system 1 in the brake bi-wire technique comprises a brake pedal. A pedal system 1 in the case where at least one of the vehicle output devices 70, 80 is combined with the pedal system 1 comprises an accelerator pedal.

The pedal system and the vehicle output devices are free of mechanical connection therebetween and connected to each other through exchange of electric signals. Information is transmitted between the pedal system and the vehicle output devices by way of communication through a communication path 111. An operation input to the pedal system is transmitted as an electric signal to the vehicle output devices and the vehicle output devices give a vehicle output on the basis of the transmitted signal information. Since the pedal system and the vehicle output devices are free of mechanical connection, a pedal travel and a pedal effort of the pedal system can be controlled independently of control on vehicle outputs of the vehicle output devices.

Here, details of the pedal system 1 will be described.

The pedal system. 1 comprises an actuator 4, and the actuator 4 is electrically controllable. The actuator 4 comprises, for example an electric motor or a motor, and when electric power is fed to the actuator 4, or electric current is caused to flow thereto, a member 2 turns about a rotating shaft 9 or a force in a direction of rotation is generated. The actuator 4 is controlled by an operation input processing device 8, and a pedal travel, a pedal velocity, and a pedal reaction force can be arbitrarily changed by controlling the actuator 4. The operation input processing device 8 transmits a vehicle output command to the vehicle output devices 30, 40, 50, 60, 70, 80 to give vehicle outputs according to an operation input. The pedal system 1 includes an operation input part 3 making a point of action, at which a foot steps.

The pedal system 1 includes operational information detecting means 11. The operational information detecting means 11 includes operation magnitude detecting means 12 and operation force detecting means 6. The operation magnitude detecting means 12 assumes, for example, a configuration 5 to detect an operation magnitude or a pedal travel. An operation magnitude or a pedal travel detected by the operation magnitude detecting means 12 may be that magnitude, by which the member 2 turns about the rotating shaft 9, or that magnitude, by which the operation input part 3 moves or makes a pedal travel. In certain circumstances, an operational velocity or a pedal velocity may be detected, and an operational velocity or a pedal velocity may be detected by performing calculation on the basis of an operation magnitude or a pedal travel.

The operation force detecting means 6 detects an operation force or a pedal effort and simultaneously therewith detects an operation reaction force or a pedal reaction force. Here, since the operation force detecting means 6 comprises means that detects a force, it detects an operation force and an operation reaction force as the same. A force to be detected by the operation force detecting means 6 may be one applied in order to turn the member 2 about the rotating shaft 9, or one applied in order to move or cause the operation input part 3 to make a pedal travel.

The operation input processing device 8 controls the actuator 4 on the basis of operational information detected by the operational information detecting means 11, and changes a pedal travel, a pedal velocity, or a pedal reaction force on the basis of operational information detected by the operational information detecting means 11. The operation input processing device 8 determines a vehicle output command on the basis of the operational information detected by the operational information detecting means 11 to transmit the determined vehicle output command to the vehicle output devices through the communication path 111.

The vehicle output devices 30, 40, 50, 60, 70, 80 comprise an electrically controllable braking output device. A vehicle output by the braking output device is deceleration or a braking force of a vehicle, and the braking output device generates a braking force on a vehicle or decelerates a vehicle on the basis of the transmitted vehicle output command. Accordingly, a vehicle output command to be transmitted to the braking output device may be deceleration or a braking force of a vehicle.

Here, the braking output device may comprise, for example, a caliper which is an electrically-driven brake capable of electrically controlling thrust of a piston, by which a rotor is pushed. In the case where the braking output device comprises an electrically-driven brake, it may comprise a mechanism, which comprises an actuator that generates an electric force, and in which a force generated by the actuator is converted into thrust of a piston through a mechanical construction such as a decelerator, the mechanism being able to control a braking force of a vehicle by controlling thrust of the piston.

The braking output device may comprise, for example, a caliper which is an electrically-driven hydraulic brake that causes hydraulic pressure to generate thrust of a piston, by which a rotor is pushed, and can electrically control the hydraulic pressure. In the case where the braking output device comprises an electrically-driven hydraulic brake, it may comprise a mechanism, which comprises an actuator that generates an electric force, and in which the actuator can vary hydraulic pressure, the mechanism being able to control a braking force of a vehicle by controlling the hydraulic pressure.

Accordingly, a vehicle output command to be transmitted to the braking output device may be thrust of an electrically-driven brake, or hydraulic pressure of an electrically-driven hydraulic brake.

Here, details of the braking output device 30 will be described. The braking output devices 40, 50, 60 are similar in construction to the braking output device 30. For example, the braking output device 30 causes an actuator 33 to control a braking force generated by a caliper 31. The actuator 33 is controlled by a vehicle output processing device 32. A state of the braking output device can be detected by a braking output device state sensor 35. The vehicle output device processing device 32 controls the actuator 33 according to a state of the braking output device. The vehicle output device processing device 32 may transmit a state of the braking output device to the pedal system 1 through the communication path 111 at need. A state of the braking output device may include thrust generated by an electrically-driven brake, or hydraulic pressure generated by an electrically-driven hydraulic brake.

The vehicle output devices 70, 80 comprise an electrically controllable driving output device. A vehicle output by the driving output device is speed, or acceleration or a driving force of a vehicle. The driving output device generates a driving force on a vehicle to accelerate the vehicle on the basis of the transmitted vehicle output command. Accordingly, a vehicle output command to be transmitted to the driving output device may be speed, or acceleration or a driving force of a vehicle.

A driving output device of a vehicle generally has a construction of an engine 70. However, hybrid vehicles, electric automobiles, or electrically-driven four-wheel drive cars adopt, for the driving output device, the construction of an electric motor 80 and the construction of a combination of an engine and an electric motor.

Here, details of the driving output device 70 will be described. The driving output device 70 comprises an engine, which is, for example, a mechanism that drives a vehicle with gasoline or light oil as a fuel. The driving output device 70 controls an actuator 72 or an ignition plug 73 according to the transmitted vehicle output command and a state of the driving output device to cause an engine 71 to generate a vehicle output. A state of the driving output device is detected by a driving output device state sensor 75. The actuator 72 is controlled by a vehicle output processing device 74. The vehicle output processing device 74 may transmit a state of the driving output device to the pedal system 1 through the communication path 111 at need. A state of the driving output device may include a driving force or the number of revolutions of the engine 71.

Here, details of the driving output device 80 will be described. The driving output device 80 comprises, for example, an electric motor which creates a vehicle output by feeding an electric power or by causing an electric current to flow. The driving output device 80 comprises, for example, an actuator 83 and a sensor 85 that controls the actuator, and is controlled by a vehicle output device processing device 84. The vehicle output device processing device 84 may transmit a state of the driving output device 80 to the pedal system 1 through the communication path 111 at need.

Here, there are actually some cases where a vehicle output command and a vehicle output are not necessarily in accord with each other. However, how correctly the vehicle output device can output a vehicle output up to a vehicle output command does not constitute an essential factor in the invention. Therefore, it is assumed in the following description that a vehicle output becomes equal to a vehicle output command. That is, according to the invention, a vehicle output may be replaced by a vehicle output command, and outputting a vehicle output by a pedal effort has the same meaning as that of outputting a vehicle output command by a pedal effort. Further, in the drawings, an axis of a vehicle output is essentially equivalent to an axis of a vehicle output command, and a vehicle output command may be used in place of a vehicle output.

The communication path 111 comprises an information path, through an electric signal, connecting between the pedal system and the vehicle output device, and is physically composed of wire. In many cases, the pedal system and the vehicle output device are mounted in spatially distant locations, and information therebetween is generally exchanged therebetween through the communication path 111 with the use of an electric signal of time-shared multiplex communication system. A system of an electric signal used in the communication path 111 may be of serial communication, or multiplex communication such as CAN, FlaxRay, LAN, etc.

FIGS. 3*a*-3*d* show the construction of the operation input processing device, the vehicle output processing device, and the communication path. FIG. 3*a* shows one communication path and vehicle output devices 151 to 154 controlled by one vehicle output processing device 150. Like, for example, ABS devices and side slip preventive devices, the construction may be provided such that one device is provided to control hydraulic pressure, hydraulic pressure is transmitted to respective calipers, and electric communication with the operation input processing device 8 is provided through one communication path.

FIG. 3*b* shows two communication paths and vehicle output devices 156 to 160 controlled by a plurality of vehicle output processing devices 155, 158. For example, in the case where separate hydraulic systems are allotted to front wheels and rear wheels of a vehicle, two devices are provided to control hydraulic pressure, and two paths for electric communication with the pedal system are needed. Since two systems are provided, it is possible to achieve an improvement in reliability and to give vehicle outputs with respect to each system, thereby enabling achieving an improvement in kinematical performance of a vehicle.

FIG. 3*c* shows one communication path and vehicle output devices 165 to 168, respectively, controlled by separate vehicle output processing devices 161 to 164. For example, in the case where electrically-driven brakes are mounted on all four wheels of a vehicle, it is conceivable that devices are provided on respective wheels to control a vehicle output and perform communication with the pedal system. All the four wheels of a vehicle control a vehicle output independently whereby it is possible to achieve an improvement in kinematical performance of a vehicle in a further high level.

FIG. 3d shows two communication paths and vehicle output devices 173 to 176, respectively, controlled by separate vehicle output processing devices 169 to 172. For example, in the case where electrically-driven brakes are mounted on all four wheels of a vehicle, when devices are provided on the respective wheels to control a vehicle output, the construction may be provided, in which a front, right wheel and a rear, left wheel communicate with the pedal system through a common communication path and a front, left wheel and a rear, right wheel communicate with the pedal system through another common communication path. For example, in the case where electrically-driven brakes are mounted on all four wheels of a vehicle, when devices are provided on the respective wheels to control a vehicle output, the construction may be provided, in which two front wheels communicate with the pedal system through a common communication path and two rear wheels communicate with the pedal system through another common communication path. Since communication paths are made double, the vehicle output devices belonging to one of the communication paths operate even in the case where obstacle and failure occur in the other of the communication paths, so that it is possible to achieve an improvement in reliability for a whole vehicle.

Figure 4B:
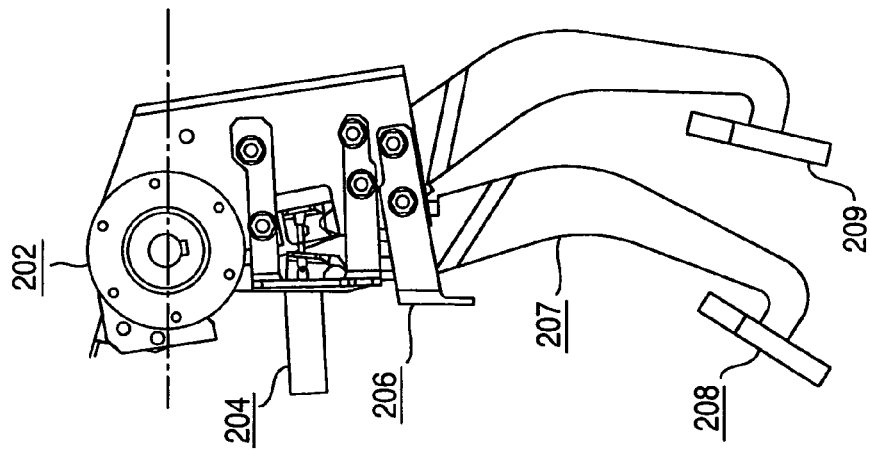
FIGS. 4a and 4b are schematic views showing an example of a pedal system.
Figure 4A:
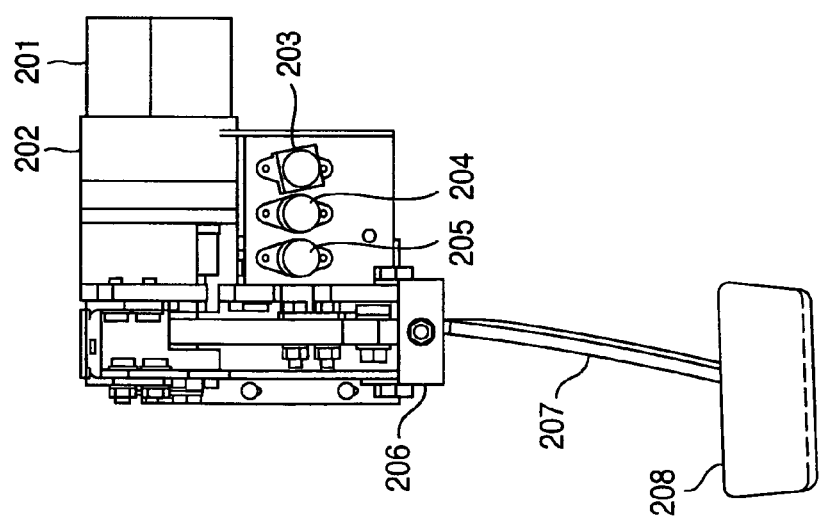

FIGS. 4a and 4b shows an example of a pedal system. FIG. 4a is a view as viewed from the front when seen from a driving seat in a state, in which a pedal system is mounted to a vehicle, and FIG. 4b is a view showing the pedal system as viewed from laterally.

The pedal system shown in FIGS. 4a and 4b comprises an actuator 201. The actuator 201 comprises an electric motor or a motor, and electric power is fed to the actuator, or electric current is caused to flow thereto, whereby the actuator rotates and generates a force in a direction of rotation. The actuator 201 may comprise a DC motor, or a DC brushless motor, an AC induction motor, or an AC synchronous motor.

The pedal system shown in FIGS. 4a and 4b comprises a decelerator 202. The decelerator 202 may comprise a gear, or a planetary gear, or a differential decelerator.

The pedal system shown in FIGS. 4a and 4b comprises a pedal switch 203. The pedal switch 203 comprises a switch capable of discriminating between when a pedal is stepped and when a pedal is not stepped.

The pedal system shown in FIGS. 4a and 4b comprises pedal stroke sensors 204, 205. The pedal stroke sensors 204, 205 can detect a pedal travel or a pedal stroke as an operation magnitude. Since the two pedal stroke sensors are provided, detection of an operation magnitude can be heightened in accuracy and resistance for failure in one of the sensors is obtained to enable an improvement in reliability.

The pedal system shown in FIGS. 4a and 4b comprises an original position stopper 206. An original position indicates a pedal travel when a driver steps on a pedal, or a pedal travel when an operation force or a pedal effort is not or little applied to the pedal system. Here, it can be said that a pedal travel is 0 when a pedal is present in the original position. Whether a pedal is present in the original position may be judged by the pedal switch 203. Conversely, when a pedal is present in the original position, it may be determined that the pedal is not stepped.

In FIG. 4b, a member 207 can move leftward to a location where it strikes against the original position stopper 206. In FIG. 4b, a direction of leftward movement, that is, movement to the original position is defined as a driving seat direction, or a near side direction, or a return direction, or a release direction. In FIG. 4b, a direction of rightward movement, that is, movement when a pedal is stepped is defined as a depth direction, or a stepping direction.

The pedal system shown in FIGS. 4a and 4b comprises a pedal end 208. The pedal end 208 is that portion, which a driver steps, and corresponds to the input unit 3 of the pedal system 1. When a pedal effort is applied to the pedal end 208, the pedal makes a pedal travel, and a pedal travel is moved as shown by, for example, 209. A pedal travel is defined to assume a large value as it goes in a depth direction, and to assume a small value as it goes in a near side direction, and when the pedal is moved from a near side to a depth side is defined as stepping or treading a pedal. When the pedal is moved from a depth side to a near side is defined as releasing or returning a pedal. Further, when the pedal is maintained so that a pedal travel is not changed is defined as holding a pedal. In general pedal systems, a pedal travel is in the order of 0.03 to 0.1 m when a maximum pedal travel is made.

Figure 5:
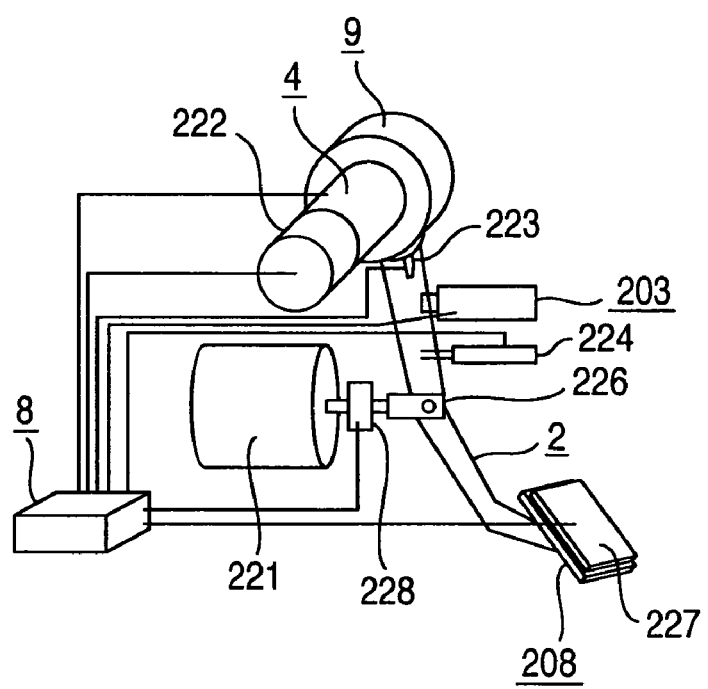
FIG. 5 is a schematic view showing an example of a pedal system.

FIG. 5 schematically shows an example of a pedal system, and FIG. 6 is a block diagram schematically showing the pedal system of FIG. 5 and related means. The pedal system shown in FIGS. 5 and 6 comprises passive reaction force means 221. The passive reaction force means 221 may comprise a mechanism with a spring, or a hydraulic mechanism, such as stroke simulator, having a viscosity.

Here, a pedal reaction force created by the actuator 4 is referred to as an active reaction force, and a pedal reaction force created by the passive reaction force means 221 is referred to as a passive reaction force. The pedal system 1 can create a pedal reaction force being a combination of an active reaction force and a passive reaction force. Since a passive reaction force created by the passive reaction force means 221 is determined by mechanical characteristics of the passive reaction force means 221 and cannot be controlled electrically, an active reaction force is added to or subtracted from a passive reaction force to create a pedal reaction force.

Figure 7A:
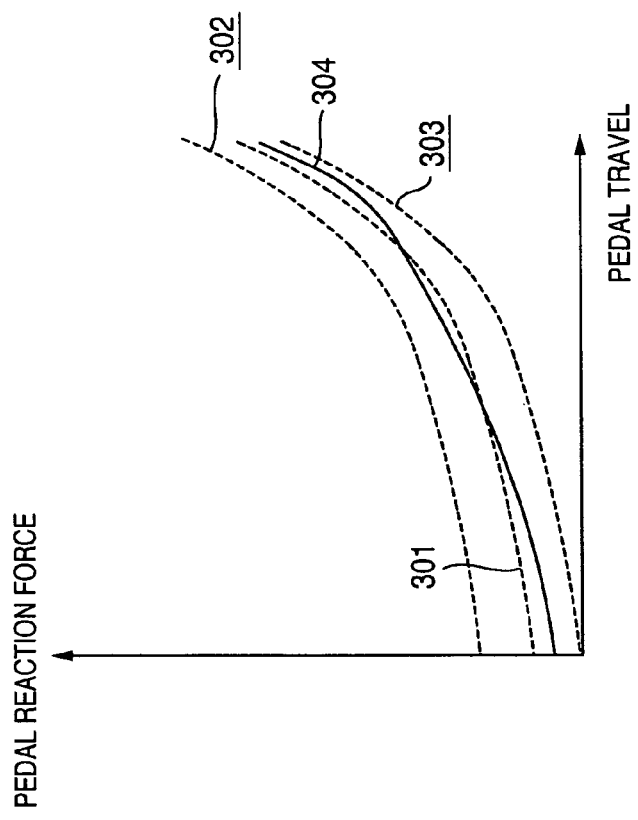
FIGS. 7a and 7b are graphs illustrating an example of characteristics of a pedal reaction force.
Figure 7B:
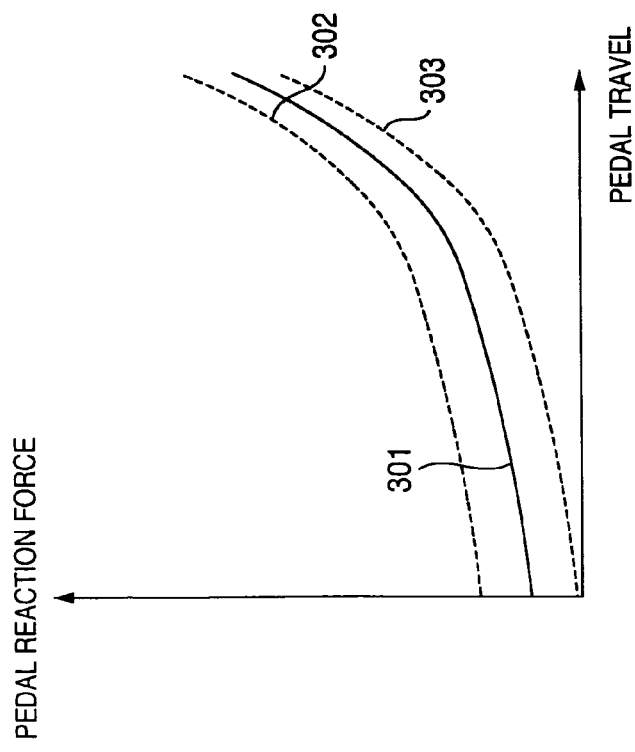

FIGS. 7a and 7b show examples indicative of the relationship among a passive reaction force, an active reaction force, and a pedal reaction force. The reference numeral 301 denotes a passive reaction force, which is not varied by an electric element. Since an active reaction force can vary electrically and arbitrarily, a pedal reaction force can be varied in the range of, for example, 302 to 303. The larger a pedal travel, the larger the passive reaction force 301, while a pedal reaction force, which can be varied by an active reaction force, is constant in range irrespective of a pedal travel. A pedal reaction force, which centers on the passive reaction force 301 and to which an active reaction force is added, can assume an arbitrary value between 302 and 303. Therefore, it is possible to realize a pedal reaction force such as 304. The actuator 4 can be decreased in capacity, or magnitude, or power consumption by the use of passive reaction force means. In the case where the actuator 4 can create a sufficient pedal reaction force, a pedal system may be formed only by an active reaction force without the use of the passive reaction force means 221.

The pedal system shown in FIGS. 5 and 6 comprises an actuator control sensor 222 capable of detecting a rotational angle or a rotational phase of the actuator 4. The sensor 222 may comprise an encoder making use of light or magnetism, or a resolver.

The pedal system shown in FIGS. 5 and 6 includes a pedal rotational angle sensor 223 capable of detecting an angle, over which the member 2 turns about the rotating shaft 9. The sensor 223 may comprise a potentiometer using a variable resistance, or a rotary encoder, or a system, in which rotating slits are used and detection is performed by an optical pick-up, or a system, in which a magnetic element is used to detect a change in magnetism.

The pedal system shown in FIGS. 5 and 6 includes a pedal travel sensor 224 capable of detecting a magnitude, over which the member 2 or the pedal end 208 travels, or a pedal travel. The sensor 224 may comprise a potentiometer using a variable resistance, or a method of detecting a displacement width as a change in magnetic resistance with the use of a magnetic circuit.

Here, it is possible to detect a pedal travel or a pedal velocity with the use of at least one of the sensors 222, 223, 224, and the operation magnitude detecting means 12 includes at least one of the sensors 222, 223, 224.

The pedal system shown in FIGS. 5 and 6 includes a pedal effort sensor 227. The sensor 227 can detect a pedal effort, with which a driver steps on a pedal, or a pedal reaction force, with which a pedal pushes back a driver's foot. The pedal system shown in FIGS. 5 and 6 includes a rod force sensor 228. The sensor 228 can detect a force acting between the member 2 and the passive reaction force means 221. The sensors 227, 228 may be constructed to detect a force with the use of, for example, a change in resistance of a strain gauge. Here, it is possible to detect an operation force or a pedal effort with the use of at least one of the sensors 227, 228, and the operation force detecting means 6 includes at least one of the sensors 227, 228.

The pedal system shown in FIGS. 5 and 6 includes a pedal switch 203. Here, in the case where the pedal system 1 is a brake pedal, the pedal switch 203 may comprise a brake switch, and in the case where the pedal system 1 is an accelerator pedal, the pedal switch 203 may comprise an accelerator switch.

Here, the pedal system 1 detects vehicle information with the use of vehicle information detecting means 241. Vehicle information includes wheel speed, vehicle speed, acceleration, shift position, a state of a parking brake, etc. The vehicle information detecting means 241 includes a wheel speed sensor 251, a vehicle speed sensor 252, an acceleration sensor 253, a shift position switch 256, and a parking brake switch 257. The shift position switch may comprise a shift position sensor.

Here, the wheel speed sensor 251 may comprise a system, in which a magnetic circuit mounted to an axle shaft is used to detect the number of rotation of a wheel, or a system, in which a slit disk is mounted to an axle shaft and the number of rotation of a wheel is detected by light. The vehicle speed sensor 252 may comprise a system, in which a vehicle speed is directly detected, or a system, in which a vehicle speed is found and detected on the basis of the wheel speed found by the wheel speed sensor 251. The acceleration sensor 253 may comprise a system, in which a strain gauge is used to detect acceleration and a yaw rate related to a vehicle. The shift position switch 256 detects where a shift position is. Shift position may indicate, for example, R range, D range, N range, and P range. The parking brake switch is one that detects a state of a parking brake, and can discriminate whether the parking brake is in operation.

The pedal system 1 uses environmental information detecting means 242 to detect environmental information. The environmental information includes the relationship thereof with other vehicles, pedestrians, and obstacles, and a gradient of a road. Here, the relationship with other vehicles, pedestrians, and obstacles includes relative distances, relative speeds, and collision time. Collision time is an expected time until collision against other vehicles, pedestrians, and obstacles, and represented by collision time=relative distance/relative speed.

The environmental information detecting means 242 includes an external recognition sensor 260 and a gradient sensor 263. The external recognition sensor 260 may comprise an infrared laser, or a radar that uses millimeter waves to detect a relative distance to another vehicle and an obstacle, or a relative speed. The external recognition sensor 260 may comprise a system, in which ultrasonic wave or an optical camera is used to detect a relative distance to another vehicle and an obstacle, or a relative speed.

The gradient sensor 263 detects a gradient of a road, on which a vehicle is traveling. Here, when a road is flat, a gradient is defined as 0 degree, a gradient of a downhill road is defined as negative, and a gradient of an uphill slope is defined as positive. The gradient sensor may be one that uses, for example, an acceleration sensor, or makes use of gravitation to find a gradient of a travel road. The gradient sensor may be one that finds a gradient of a travel road through calculation on a driving force or a braking force, which is generated in traveling, and a state of movement of a traveling vehicle.

The operation input processing device 8 uses operational information or vehicle information or environmental information to control operation input control means 10 to vary a pedal reaction force generated on the operation input part 208, or to vary a pedal travel and a pedal velocity, and uses operational information or vehicle information or environmental information to transmit a vehicle output command to a vehicle output device 121, thus generating a vehicle output.

Figure 8C:
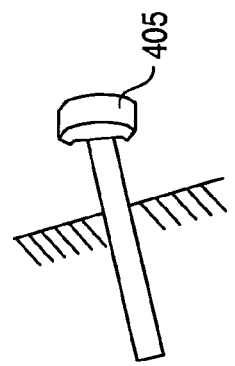
FIGS. 8a-8g are schematic views showing applications of a pedal system.
Figure 8B:
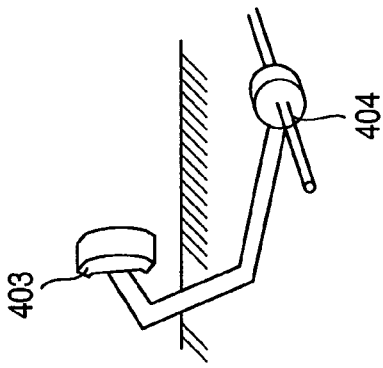
Figure 8A:
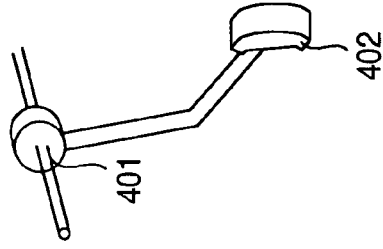
Figure 8G:
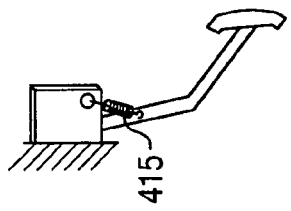
Figure 8F:
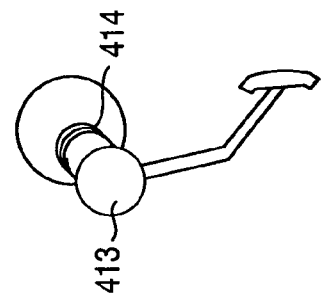
Figure 8E:
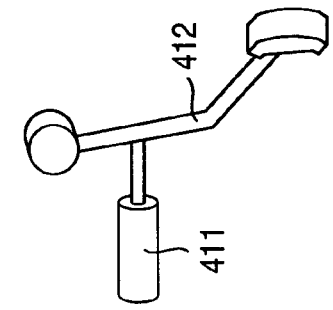
Figure 8D:
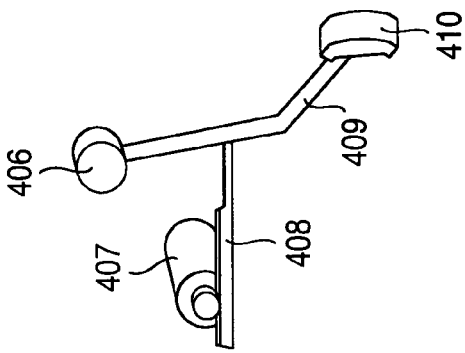

FIGS. 8*a* to 8*g* are schematic views showing applications of a pedal system. FIG. 8*a* shows a pedal system, in which an operation input portion 402 is disposed below a rotating shaft 401, and FIG. 8*b* shows a pedal system, in which an operation input portion 403 is disposed above a rotating shaft 404. FIG. 8*c* shows the case where any rotating shaft is not provided and a pedal system direct-acts for an operation input to an operation input portion 405, and FIG. 8*d* shows a pedal system, in which a rotating shaft 406 and an actuator 407 are separate from each other. Rotational output of the actuator 407 is converted into an output in a linear movement direction by a rotation and linear movement conversion mechanism 408 to act on a member 409, thereby moving a pedal end 410 and generating an operational reaction force. Here, for example, a worm gear or a ball screw may be used as rotation and linear movement conversion means.

FIG. 8*e* shows a pedal system in the case where an actuator 411 is not a rotating electric motor but is displaces or produces a force in a linear movement direction. Output of the actuator 411 acts on a member 412 to thereby move a pedal travel and generate an operational reaction force. The actuator 411 may comprise, for example, a solenoid. Further, FIG. 8*f* shows a pedal system in the case where passive reaction force means 414 is mounted to a rotating shaft 413, and FIG. 8*g* shows a pedal system in the case where passive reaction force means 415 is mounted in the vicinity of a rotating shaft.

FIGS. 9*a* to 9*d* show examples of a pedal reaction force. The reference numeral 451 in FIG. 9*a* is referred as a stiffness reaction force, which is varied in magnitude according to a pedal travel, and the larger a pedal travel, the larger its value. Here, it can be said that a pedal having a relatively large stiffness reaction force relative to a pedal travel is a stiff pedal and a pedal having a relatively small stiffness reaction force relative to the same pedal travel is a soft pedal.

The reference numeral 453 in FIG. 9b is referred as a viscosity reaction force, which is varied in magnitude according to a pedal velocity, and the larger a pedal velocity, the larger its value. Here, in the case where a pedal velocity is indicated by 454 in FIG. 9c when a pedal is stepped, a viscosity reaction force is indicated by 455 in FIG. 9d. A pedal reaction force amounts to the sum of a stiffness reaction force and a viscosity reaction force, and is indicated by 452 in FIG. 9a.

Here, assuming that F indicates a pedal reaction force and x indicates a pedal travel, a pedal velocity is represented by dx/dt. Assuming that Fk(x) indicates a stiffness reaction force dependent upon a pedal travel and Fd(dx/dt) indicates a viscosity reaction force, a formula (1) or a formula (2) is resulted.

$$F=Fk(x)+Fd(dx/dt) \quad (1)$$

$$F=Fk(x)+Kd \times (dx/dt) \quad (2)$$

Accordingly, Fd(dx/dt) is represented by a formula (3) where Kd is a predetermined constant.

$$Fd(dx/dt)=Kd \times dx/dt \quad (3)$$

Figure 10B:
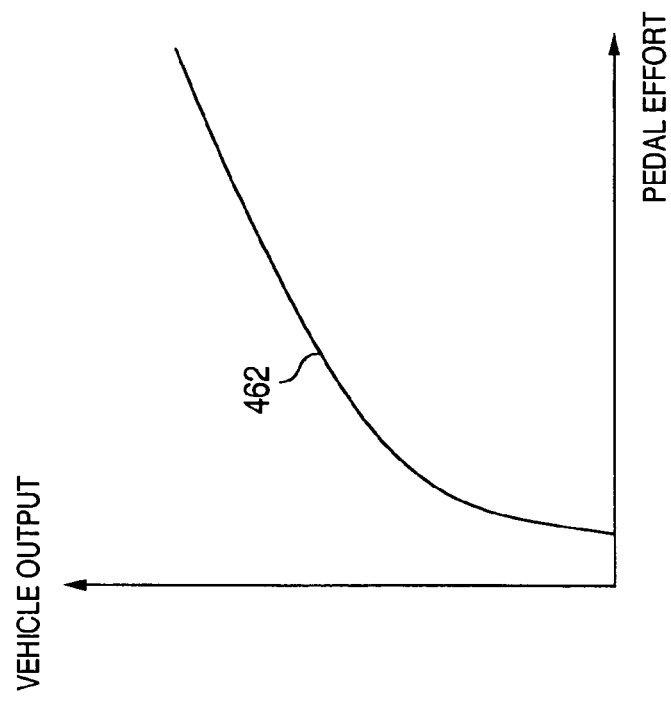
FIGS. 10a and 10b are graphs illustrating an example of characteristics of a vehicle output.
Figure 10A:
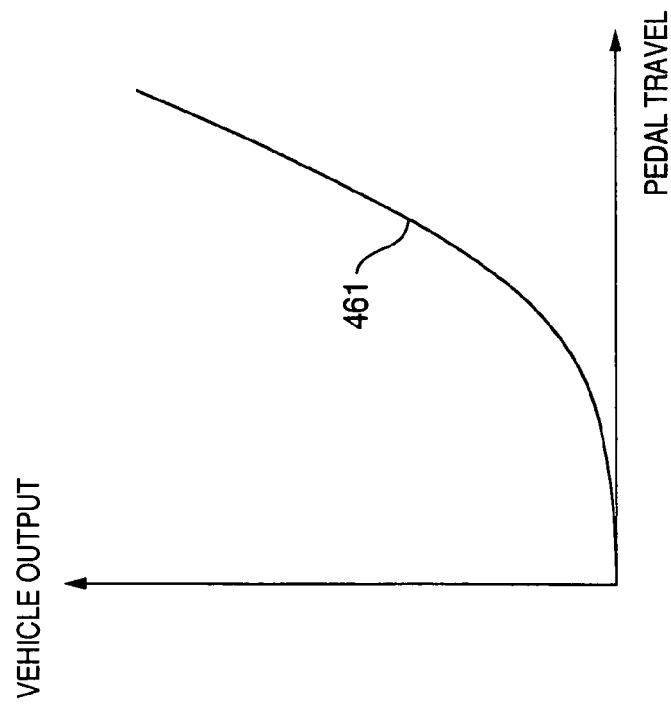

Here, a vehicle output can be set, for example, as shown in FIGS. 10a and 10b. A vehicle output must have correlation with an operation input, so that a vehicle output may be generated according to a pedal travel, or a vehicle output may be generated according to a pedal effort or a pedal reaction force. In the case where a vehicle output is to be set on the basis of a pedal travel, a vehicle output is set so as to be downwardly convex as shown in FIG. 10a. In the case where a vehicle output is to be set on the basis of a pedal effort, a vehicle output is set so as to be upwardly convex as shown in FIG. 10b.

Since a driver operates a vehicle with feeling an operation magnitude and an operational reaction force, easiness of operation (operability), less susceptibility to fatigue, and enjoyment of operation (comfort) are varied due to the relationship among an operation magnitude, an operational reaction force, and a vehicle output. Therefore, the pedal system uses the operation input control means 10 to realize a pedal travel, a pedal reaction force, and a vehicle output, which are preferably related to one another.

Here, assuming that a stepping motion corresponds to the case where a driver is going to step a pedal and a releasing motion corresponds to the case where a driver is going to release a pedal, the pedal system realizes two kinds of reaction forces according to a stepping motion and a releasing motion. When the pedal system is to be operated, a motion is in some cases performed, in which almost the same magnitude of stepping is maintained with a pedal stepped and it is tried to continue a constant driving force or a constant braking force. Assuming that this to be a holding motion, the pedal system realizes a reaction force in the holding motion in addition to a stepping motion and a releasing motion.

Figure 11:
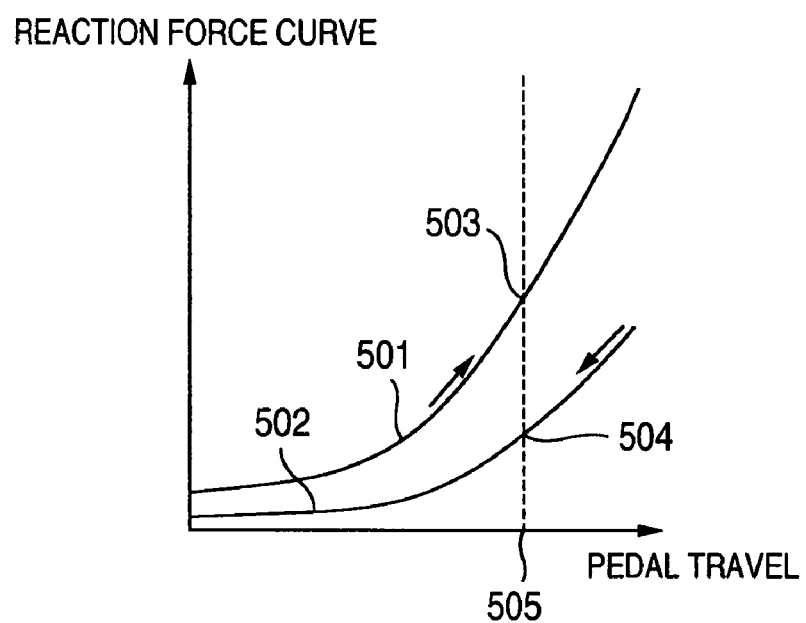
FIG. 11 is a graph illustrating an example of an increasing reaction force curve and a decreasing reaction force curve.

A pedal system uses two kinds of reaction force curves, as shown in FIG. 11, as a control target of a pedal reaction force. An increasing reaction force curve 501 is one indicative of the relationship between a pedal reaction force and a pedal travel, which are mainly generated when a driver is going to step a pedal. A decreasing reaction force curve 502 is one indicative of the relationship between a pedal reaction force and a pedal travel, which are mainly generated when a driver is going to release a pedal. The increasing reaction force curve 501 may be equivalent to a stiffness reaction force when a driver is going to perform a stepping motion, and the decreasing reaction force curve 502 may be equivalent to a stiffness reaction force when a driver is going to perform a releasing motion.

While a pedal effort by a driver is substantially equivalent to a pedal reaction force, a pedal reaction force, for which responsibility of an actuator and motive power are needed, is not realized fully and a pedal system involves a mechanical friction with the result that the relationship between a pedal travel and a pedal reaction force, which is a target of control, cannot be realized and so a pedal reaction force being a target of control and an actual pedal reaction force are not necessarily in accord with each other. Since a pedal effort is substantially equivalent to a pedal reaction force, there is a possibility that in the case where a pedal reaction force being a target of control and an actual pedal reaction force are not in accord with each other, balance of forces as estimated is not maintained and a pedal performs a motion not intended by a driver. For example, in the case where an actual pedal reaction force is smaller than a pedal effort being equal to or less than the decreasing reaction force curve, a pedal travel varies in a stepping direction. When a pedal effort is equal to or less than the decreasing reaction force curve, however, it should be determined that a driver intends for a releasing motion and so a pedal system must realize a pedal reaction force along a release direction, or a reaction force according to the decreasing reaction force curve 502 irrespective of a direction, in which a pedal travel varies.

Therefore, judgment on a stepping motion, a releasing motion, and a holding motion is made using a pedal effort, the increasing reaction force curve and the decreasing reaction force curve.

FIGS. 12a and 12b show examples of a logic flow for the judgment on a stepping motion, a releasing motion, and a holding motion. For example, it is judged in S511 that when a pedal effort is equal to or larger than the increasing reaction force curve, a stepping motion is made, and it is judged in S512 that when a pedal effort is equal to or less than the decreasing reaction force curve, a releasing motion is made. It is judged that when a pedal effort is smaller than the increasing reaction force curve and larger than the decreasing reaction force curve, a holding motion is made.

Here, in order to make a comparison with respect to the magnitude correlation of a pedal effort and the increasing reaction force curve or the decreasing reaction force curve, in the case where that magnitude, by which a pedal is stepped, or a pedal travel at that point of time is present at 505 in FIG. 11, for example, a stepping motion may be defined when a pedal effort is equal to or larger than a threshold 503, a releasing motion may be defined when a pedal effort is equal to or less than a threshold 504, and a holding motion may be defined when a pedal effort is between the threshold 503 and the threshold 504.

A pedal system changes a reaction force depending upon a stepping motion or a releasing motion. For example, in case of a stepping motion, a reaction force represented by 531 in FIG. 13a may be generated, and in case of a releasing motion, a reaction force represented by 532 may be generated. Here, the same as the threshold 501 for judgment of a stepping motion may be used for 531, and 533 being a larger reaction force than 501 may be used. A viscosity reaction force or the like is cited as a cause for 533 being larger than 501. The same value as 502 being a threshold for judgment of a releasing motion may be used for 532, and 534 being a smaller reaction force than 502 may be used. A viscosity reaction force or the like is cited as a cause for 534 being smaller than 502.

Further, the kinematical performance of a vehicle is changed depending upon a stepping motion or a releasing motion. For example, a vehicle output may be set as shown in FIGS. 13b and 13c. In a stepping motion, a vehicle output may be caused to generate like 535 or 537, and in a releasing motion, a vehicle output may be caused to generate like 536 or 538. By changing a vehicle output depending upon a stepping motion or a releasing motion, the rising of a vehicle output for a stepping motion is improved in response and the falling of a vehicle output for a releasing motion is improved in response, so that it is possible to realize that kinematical performance of a vehicle, which makes a driver easy to operate a vehicle.

By changing a pedal reaction force depending upon a stepping motion or a releasing motion, it is possible to realize a firm effect of stepping for a stepping motion and to perform an operation with some small pedal effort for a holding motion or a releasing motion, thus enabling a pedal system, which is easy to operate and hard to cause fatigue. For example, it is possible to realize a pedal system, which eliminates the need of continuously providing a large pedal effort for a slowly releasing motion while realizing a stiff feeling for stepping.

Further, when a driver operates a pedal system, a pedal travel is changed while increasing or decreasing a pedal effort but generally it is not easy to continue to step a pedal while maintaining a pedal effort constant, and in the case where there is little difference between the increasing reaction force curve and the decreasing reaction force curve, it becomes difficult to continue to step a pedal or to smoothly perform a stepping motion and a releasing motion. Therefore, the relationship between the increasing reaction force curve and the decreasing reaction force curve, or between a pedal travel and a pedal reaction force in a holding motion between a pedal reaction force in a stepping motion and a pedal reaction force in a releasing motion becomes important.

Figure 14A:
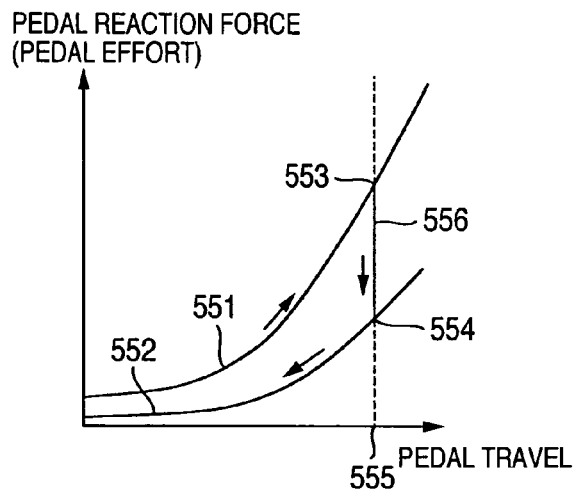
FIGS. 14a-14d are graphs illustrating an example of the relationship between a pedal travel and a pedal reaction force (a pedal effort) in a holding motion.
Figure 14B:
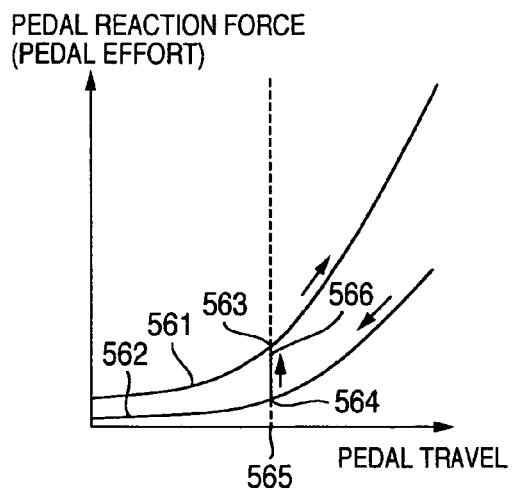

Here, a holding motion is generally performed in the case where a driver continues to step a pedal. Accordingly, in case of a holding motion, a pedal travel may not be changed irrespective of a pedal effort as shown in FIGS. 14a and 14b.

Here, 556 indicates the case where a pedal effort is decreased after stepping is performed to a pedal travel 555 along a curve of a pedal reaction force 551. In the case where a pedal effort exceeds 553 after a pedal reaction force becomes 556, a pedal travel travels again to the depth side along the curve of 551, and in the case where a pedal effort falls below 554, a pedal travel travels to a near side along the curve of 552. 566 indicates the case where a pedal effort is increased after a pedal is released to a pedal travel 565 along a curve of a pedal reaction force 562. In the case where a pedal effort falls below 563 after a pedal reaction force becomes 566, a pedal travel travels again to the near side along a curve of 561, and in the case where a pedal effort exceeds 564, a pedal travel travels to the depth side along the curve of 562.

In the case where a pedal effort is between 553 and 554, or between 563 and 564, a pedal travel does not vary at 555 or 565, so that even when varying a pedal effort to some extent, a driver can continue to step a pedal while maintaining the same pedal travel.

A holding motion indicates the case where a driver switches between a stepping motion and a releasing motion. Therefore, depending upon setting of a pedal effort in a stepping motion and a releasing motion, there are some cases where it is difficult to delicately adjust a pedal travel and it is not possible to quickly switch between a stepping motion and a releasing motion if a pedal travel does not vary entirely in a holding motion.

Figure 14C:
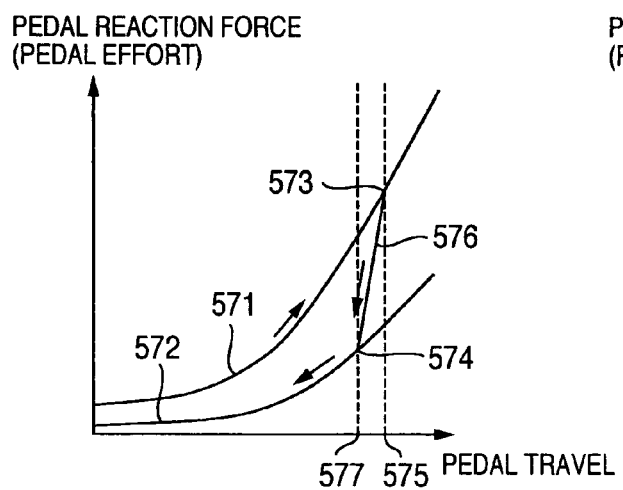
Figure 14D:
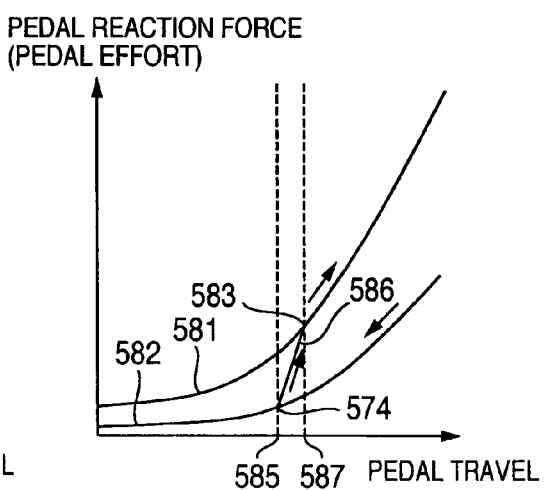

Hereupon, the relationship between a pedal travel and a pedal reaction force may be inclined in a holding motion as shown in, for example, FIGS. 14c and 14d to travel a pedal travel to some extent according to a pedal effort.

Here, 576 indicates the case where a pedal effort is decreased after stepping is performed to a pedal travel 575 along a curve of a pedal reaction force 571. In the case where a pedal effort exceeds 573 after a pedal reaction force becomes 576, a pedal travel travels again to the depth side along the curve of 571, and in the case where a pedal effort falls below 574, a pedal travel travels to the near side along a curve of 572. 586 indicates the case where a pedal effort is increased after a pedal is released to a pedal travel 585 along a curve of a pedal reaction force 582. In the case where a pedal effort falls below 583 after a pedal reaction force becomes 586, a pedal travel travels again to the near side along a curve of 581, and in the case where a pedal effort exceeds 584, a pedal travel travels to the depth side along the curve of 582.

In the case where a pedal effort is between 573 and 574, or between 583 and 584, a pedal travel varies slightly between 575 and 577, or between 585 and 587, so that a driver can change a pedal travel delicately by varying a pedal effort while maintaining the substantially same pedal travel.

A gradient of a pedal reaction force or a pedal effort relative to a pedal travel in a holding motion in FIGS. 14a-14d can be variously set depending upon characteristics of a whole vehicle, a chief driver, or characteristics of a pedal effort or a vehicle output. Here, it can be said that in the case where a pedal travel does not change even when a pedal effort is varied like 556, 566, the gradient is infinite.

Figure 15A:
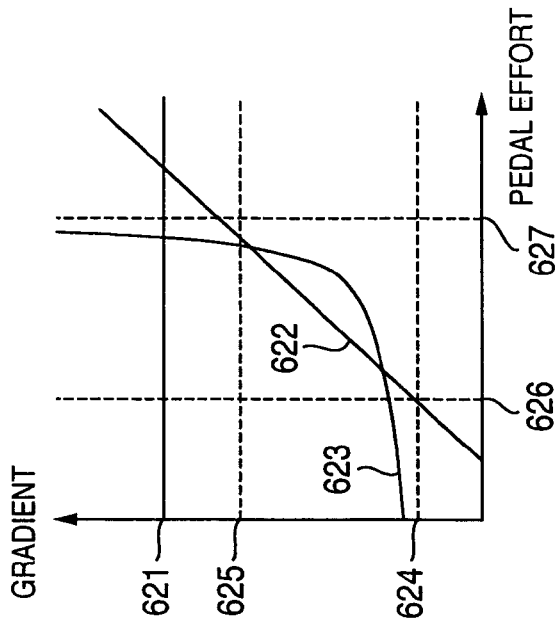
FIGS. 15a and 15b are graphs illustrating an example of characteristics of a gradient of a pedal reaction force (a pedal effort) relative to a pedal travel.
Figure 15B:
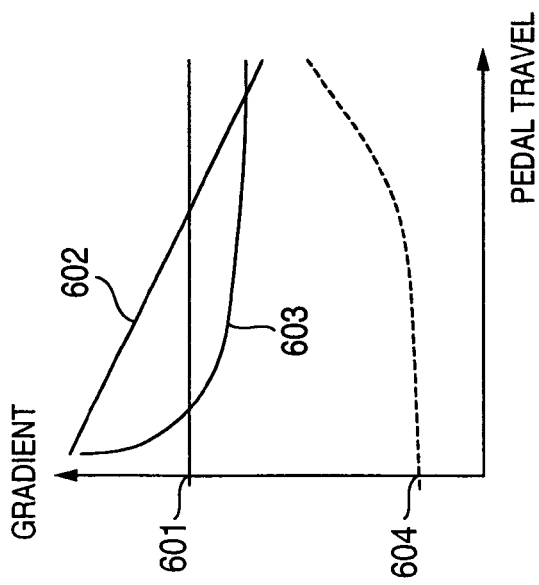

The gradient is not necessary to be constant but may be varied according to a pedal travel or a pedal effort as shown in, for example, FIGS. 15a and 15b. For example, 601 indicates the case where the gradient is always constant relative to a pedal travel. Here, a constant gradient may be infinite like 556, 566. In case of a gradient like 576, 586, the gradient is desirably 6000 N/m or more in order to ensure easiness in operating a pedal and a feeling during holding.

A gradient may be varied according to a pedal travel like 602. Here, since a driver generally operates a pedal frequently near side, it is desirable to set that gradient, by which switching between a stepping motion and a releasing motion on near side is made distinct. Therefore, in the case where a gradient is to be varied according to a pedal travel, it is desired that a gradient is larger on near side than that on the depth side.

A gradient may be set to be infinite on near side and to become small toward the depth side like 603.

Here, in order to smoothly perform a stepping motion, a holding motion, and a releasing motion, a gradient in a holding motion must be certainly larger than a gradient of a pedal reaction force relative to a pedal travel in a stepping motion and a releasing motion. Therefore, in FIG. 15a, a lower limit 604 of a gradient, which can be set, is present, and a gradient in a holding motion must exceed the lower limit 604 in the range of a pedal travel, which can travel.

FIG. 15b shows an example of a gradient relative to a pedal effort. Here, 621 indicates the case where a gradient is always constant relative to a pedal effort. Here, a constant gradient may be infinite like 556, 566. In case of a gradient like 576, 586, the gradient is desirably 6000 N/m or more in order to ensure easiness in operating a pedal and a feeling during holding.

A gradient may be varied according to a pedal effort like 622. Here, in order that a driver switches among a stepping motion, a holding motion, and a releasing motion without a sense of incongruity, it is desirable that a gradient when a pedal effort is large be larger than that when a pedal effort is small.

For example, a gradient at a threshold 627 is infinite like 623, and a gradient may be set to become small as a pedal effort becomes small. Here, the threshold 627 indicates a pedal effort, which provides a boundary for a stepping motion, and corresponds to 503, 553, 563, 583. A threshold 626 indicates a pedal effort, which provides a boundary for a releasing motion, and corresponds to 504, 554, 564, 574, 584.

Threshold 624 indicates a gradient of a pedal reaction force relative to a pedal travel in a releasing motion, and a threshold 625 indicates a gradient of a pedal reaction force relative to a pedal travel in a stepping motion.

Here, in order to smoothly perform a stepping motion, a holding motion and a releasing motion, at a threshold 626, a gradient in a holding motion must be certainly larger than a threshold 624 and at a threshold 627, it must be certainly larger than a threshold 625.

With a pedal system having an actuator, the relationship between a pedal travel and a pedal reaction force is controlled electrically whereby the relationship between a pedal travel and a pedal reaction force can be varied according to vehicle information or environmental information in traveling. With a bi-wire system, the relationship between a pedal travel or a pedal reaction force and a vehicle output can also be varied according to vehicle information or environmental information in traveling.

For example, in the case where a vehicle is traveling at high speed, there is a tendency that a pedal system having a quick responsibility and some firm effect of stepping is preferred, and some sports cars include a constantly stiff pedal for stepping and also involve a constantly relatively large vehicle output. In case of traveling at low speed, there is a tendency that a soft pedal, which is easy to operate and affords stably operating a vehicle with a small pedal effort, is preferred for a pedal system, and some family cars include a constantly soft pedal for stepping and also involve a smaller vehicle output than that for some sports cars.

That is, with conventional vehicles, there is a need of narrowing a target mainly for a driver being an object and a state of use and setting a pedal travel, a pedal reaction force, and a vehicle output, but with a pedal system having an actuator and a bi-wire system, a preferable pedal system suitable for a state at that point of time can be realized by changing the characteristics in real time.

Here, for example, in the case where the decreasing reaction force curve is small, a pedal travel and a vehicle output are finely operated with ease since a pedal reaction force and a pedal effort, which perform a holding motion, become large in the range and that pedal effort, which maintains a pedal travel while a pedal is stepped, and that pedal effort, which slowly releases a pedal to adjust a pedal travel, become small. In the case where the decreasing reaction force curve is large, a pedal reaction force and a pedal effort, which perform a holding motion, become small in the range and responsibility, with which a pedal travel returns upon a decrease in a pedal effort, is improved.

Therefore, in a situation, in which fine operation of a pedal travel and a vehicle output is needed, and in a situation, in which it is necessary to continue to step a pedal for a long period of time, it is desirable to decrease the decreasing reaction force curve and decrease a pedal reaction force in a releasing motion to increase the range of a pedal effort, which performs a holding motion. In a situation, in which there is a need for high responsibilities of a pedal travel and a vehicle output for a change in a pedal effort, it is desirable to increase the decreasing reaction force curve and increase a pedal reaction force in a releasing motion to decrease the range of a pedal effort, which performs a holding motion.

By changing the decreasing reaction force curve or a pedal reaction force in a releasing motion, it is possible not to change stiffness of a pedal for stepping, not to give a sense of incongruity to a driver, and to change the characteristics of a pedal and a feeling of driving without affecting the kinematical performance of a vehicle at the time of rapid braking. It is possible to change a vehicle output in a releasing motion along with a change in the decreasing reaction force curve or a pedal reaction force.

Here, while a pedal travel is little varied while a holding motion is performed, it is possible to operate a vehicle output in a range between a vehicle output in a stepping motion and a vehicle output in a releasing motion. Accordingly, in the case where a difference between a vehicle output in a stepping motion and a vehicle output in a releasing motion is large, a high vehicle output to some extent can be responded to an operation of a pedal by a driver even while a holding motion is performed, but there is a possibility that a vehicle output becomes hard to stabilize even while a holding motion is performed. In particular, when a vehicle output in a releasing motion is made very small, a decrease in vehicle output can be responded at high speed to an operation of a pedal in the case where a releasing motion is performed continuing to a stepping motion, but there is a possibility that it becomes difficult to maintain a constant vehicle output in the case where a holding motion is performed following a stepping motion.

Figure 16A:
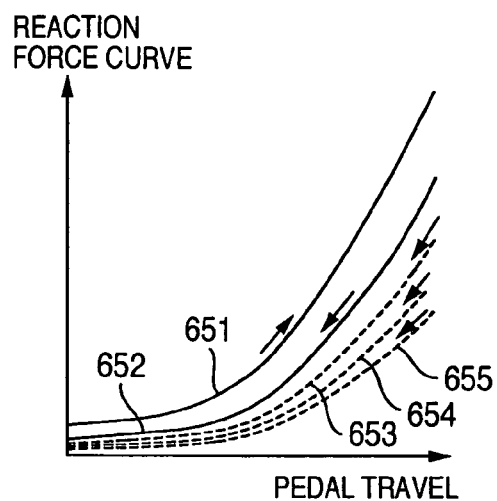
FIGS. 16a-16d are graphs illustrating an example of characteristics of a pedal travel, a pedal reaction force, and a vehicle output.
Figure 16B:
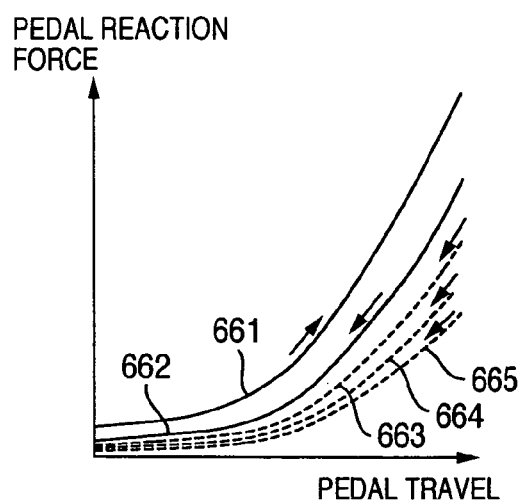
Figure 16C:
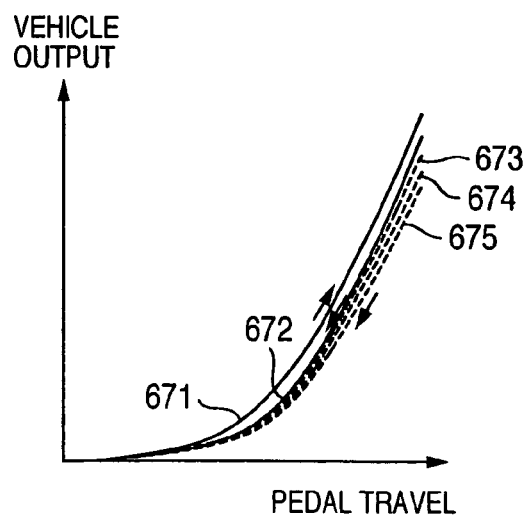
Figure 16D:
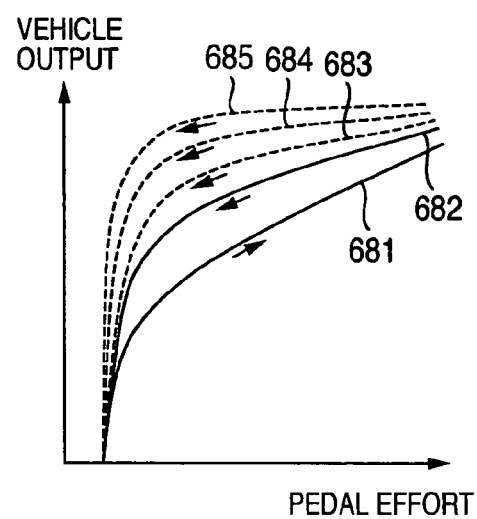

Accordingly, it is desired that the kinematical performance of a vehicle and a feeling of driving be realized according to a situation by changing a vehicle output according to parameters based on vehicle information and environmental information. For example, as shown in FIG. 16a, the parameters are used to decrease a decreasing reaction force curve 652, thus enabling providing for 653, 654, 655. A ratio, at which the reaction force curve is decreased, may vary continuously or stepwise according to the parameters. In the case where the decreasing reaction force curve 652 is made small, it is desired that a pedal reaction force 662 in a releasing motion be also changed like, for example, 663, 664, 665 corresponding to the decreasing reaction force curve as shown in FIG. 16b. Further, it is conceivable to change vehicle outputs 672, 682 like, for example, 673, 674, 675 shown in FIG. 16c, or like 683, 684, 685 shown in FIG. 16d. Here, a pedal reaction force or a vehicle output may vary continuously or stepwise according to the parameters.

Figure 17A:
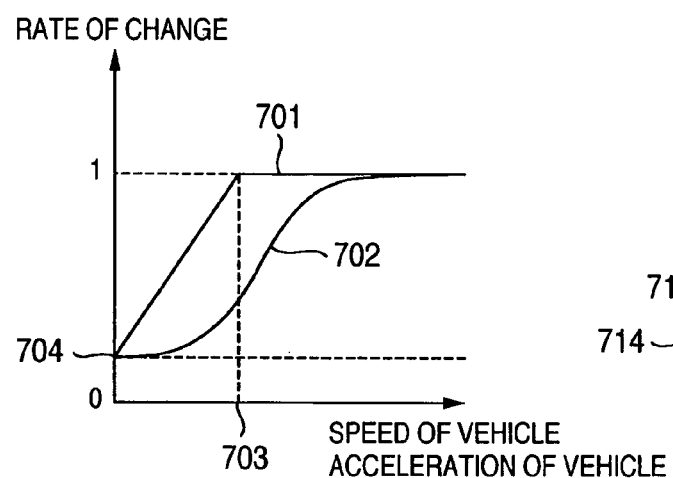
FIGS. 17a-17c are graphs illustrating an example of the relationship between a parameter and a rate of change.
Figure 17B:
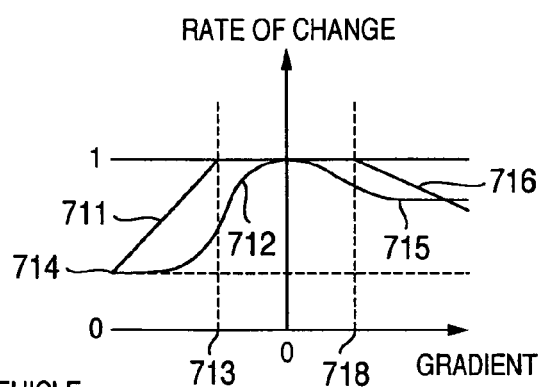

Here, FIG. 17 shows parameters and a rate of change of a decreasing reaction force curve. The rate of change varies depending upon the parameters, and a decreasing reaction force curve, a pedal reaction force or a vehicle output in a releasing motion is used after being multiplied by the rate of change. Therefore, it can be said that the rate of change is 1 at all times in a pedal system, which is not dependant upon the parameters. Since it is general that a pedal becomes hard to operate and a feeling of driving is worsened when a decreasing reaction force curve is made too small, it is desirable to prevent the rate of change from becoming equal to or less than a certain value. Further, the rate of change is needed to be present in that range, in which a decreasing reaction force curve does not exceed an increasing reaction force curve and a pedal reaction force or a vehicle output in a releasing motion does not exceed a pedal reaction force or a vehicle output in a stepping motion.

Here, for example, a speed or an acceleration of a vehicle may be used as a parameter. When a speed or an acceleration of a vehicle is large, the rate of change is increased in order to heighten an operation of a vehicle in responsibility, and when a speed or an acceleration of a vehicle is small, the rate of change is decreased in order to heighten an operation of a vehicle in stability and operability. In, for example, 701, 702 shown in FIG. 17*a*, the rate of change is minimum when a parameter is 0. The rate of change when the parameter is 0 differs according to an original setting of a pedal reaction force and assumes an arbitrary value between 0 and 1. Here, while a threshold 703 is present at a boundary of low-speed traveling and high-speed traveling and differs according to a type and use of a vehicle, it may be in the order of 20 km/h to 100 km/h. The rate of change may vary continuously like, for example, 702. When the rate of change varies continuously, a sense of incongruity becomes hard to be given to a driver.

In the case where a speed of a vehicle is not used, the rate of change may be changed depending upon, for example, whether a vehicle is traveling. For example, when a vehicle is traveling, the rate of change may be made 1, and when a vehicle is not traveling, the rate of change may be made small to be in the order of, for example, 0.2 to 0.7. By decreasing the decreasing reaction force curve and a pedal reaction force in a releasing motion when a vehicle is in stop, it suffices that a pedal effort required to continue to step a pedal in order to maintain a state of stoppage is small, so that it is possible to achieve lessening fatigue in lower ribs.

Whether a vehicle is traveling may be determined such that a vehicle is not traveling when a speed of a vehicle is, for example, 0 km/h, a vehicle is not traveling when a shift position is in the P range, and a vehicle is not traveling when a parking brake is in operation. It may be determined that a vehicle is not traveling in the case where the vehicle output devices do not generate a driving force, or a drive part does not rotate.

A gradient of a travel road of a vehicle may be used as a parameter. For example, the rate of change shown in FIG. 17*b* may be set for a gradient of a travel road.

Here, there are some cases, on a steeper downhill road than a threshold 713, where, for example, braking continues to effect, and a stepping motion or a releasing motion of a pedal is slowly performed while a brake is stepped. Therefore, when a gradient of a travel road as in 711 is smaller than that of the threshold 713, it is desirable to decrease the rate of change so that it becomes easy to hold stepping on a pedal and to perform a releasing motion with a small force. There are some cases, on a steeper downhill road than a threshold 718, where it is necessary to continue to step an accelerator. Therefore, when a gradient as in 716 is larger than that of the threshold 718, it is desirable to decrease the rate of change so that it becomes easy to hold stepping on a pedal.

Here, the threshold 713 may be made, for example, around −5 and may be made a gradient, in which gravity causes acceleration even in a state, in which an accelerator is not stepped. The threshold 718 may be made, for example, around +5 and may be made a gradient, in which gravity cancels a driving force due to the creep phenomenon.

A minimum value of the rate of change in case of a brake pedal is set to such a value that a driver can recognize a change of a pedal caused by a gradient. The value may be set in the order of, for example, 0.2 to 0.7. A maximum value of the rate of change in case of an accelerator pedal is made larger than 1 in that range, in which a decreasing reaction force curve does not exceed an increasing reaction force curve and a pedal reaction force or a vehicle output in a releasing motion does not exceed a pedal reaction force or a vehicle output in a stepping motion. Being different according to an original setting of a pedal reaction forces the rate of change may be set to, for example, 1.0 to 3.0. The rate of change may vary continuously like 712 or 715 relative to a parameter.

The relationship with a preceding vehicle or a forehand obstacle may be used as a parameter. Here, the rate of change may be set as in FIG. 17*c* by using, as the relationship, a relative distance to a preceding vehicle or a forehand obstacle, or collision time.

Here, in the case where a distance to a preceding vehicle or a forehand obstacle is small, or time until collision is short, there are some cases where it is necessary to apply strong braking and such state must be maintained as the case may be. Therefore, when a parameter as in 712 is smaller than a threshold 723, it is desirable to decrease the rate of change so that a holding motion is made easy even in case of stepping deeply. In the case where a distance to a preceding vehicle or a forehand obstacle is small, or time until collision is short, it is necessary to quickly release an accelerator pedal, so that when a parameter as in 726 is larger than the threshold 723, it is desirable to increase the rate of change so that a pedal is made easy to return. Here, while the threshold 723 differs depending upon a traveling vehicle and environmental conditions, for example, a relative distance may be 10 m to 100 m, and collision time may be, for example, 0.1 second to 1.5 second.

Figure 17C:
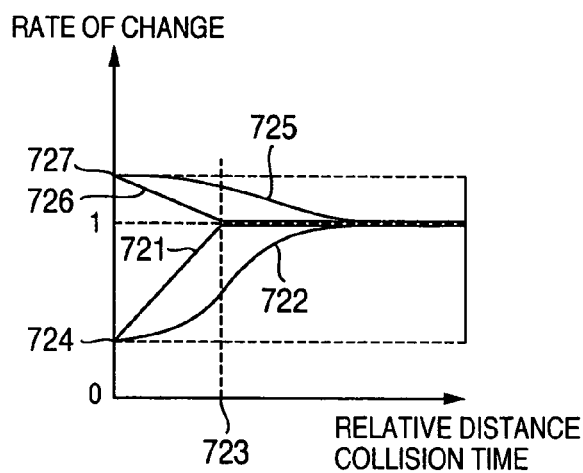

In case of a brake pedal, the rate of change when a parameter is 0 in FIG. 17*c* is set to such a value that a driver can recognize a change of a pedal caused by the relationship with a preceding vehicle or a forehand obstacle. Being different according to an original setting of a pedal reaction force, the rate of change when a parameter is, for example, 0 may be set in the order of 0.2 to 0.7. In case of an accelerator pedal, the rate of change may be set to be larger than 1 as in 727. In the case where the rate of change is made larger than 1, it is needed to be in that range, in which a decreasing reaction force curve does not exceed an increasing reaction force curve and a pedal reaction force or a vehicle output in a releasing motion does not exceed a pedal reaction force or a vehicle output in a stepping motion. For example, being different according to an original setting of a pedal reaction force, the threshold 727 may be set, for example, in the order of 1.0 to 3.0. The rate of change may vary continuously like 722 or 725 relative to a parameter.

Figure 18:
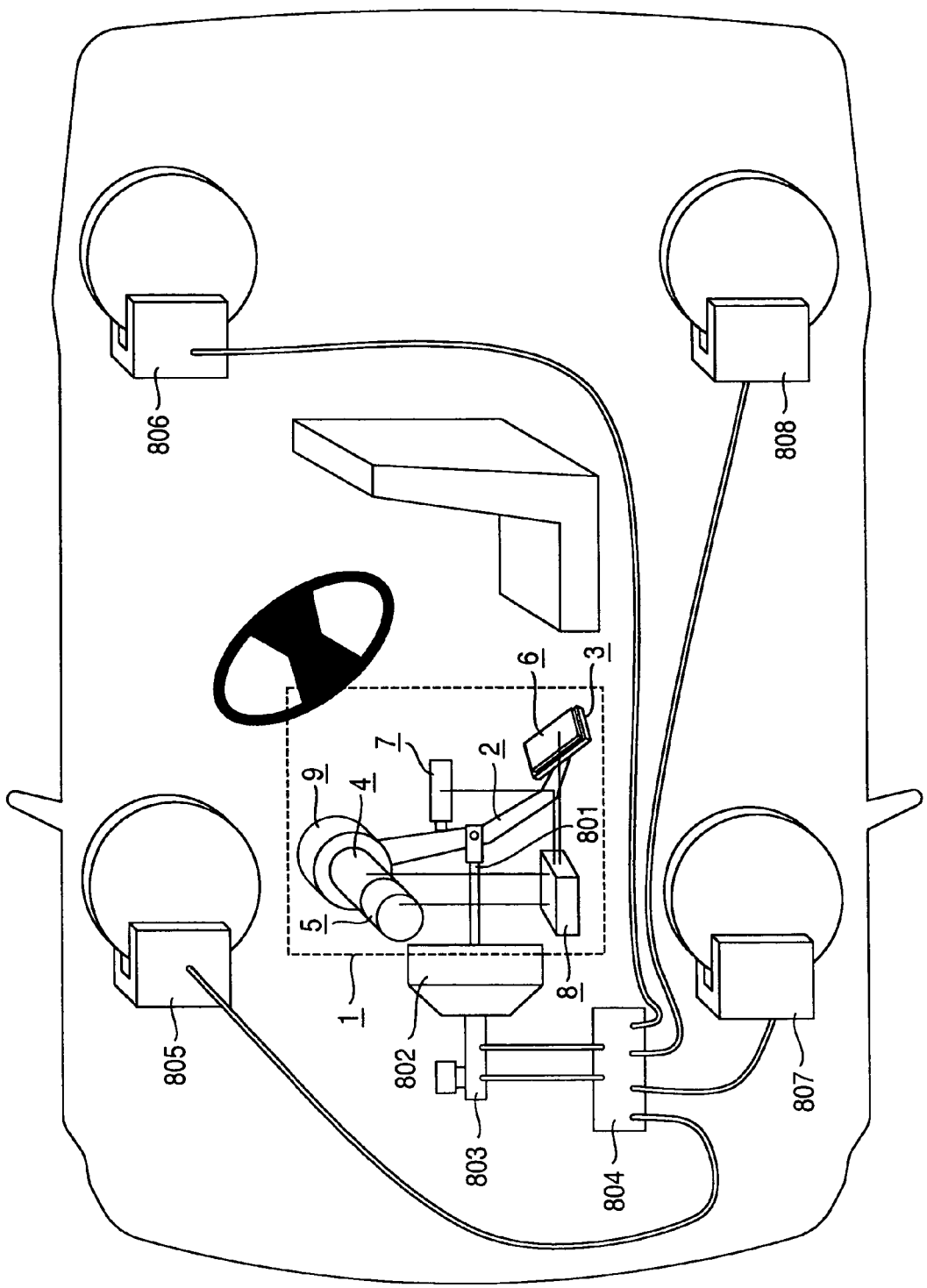
FIG. 18 is a schematic view of a system showing an example of structure of an embodiment 2.
Figure 19:
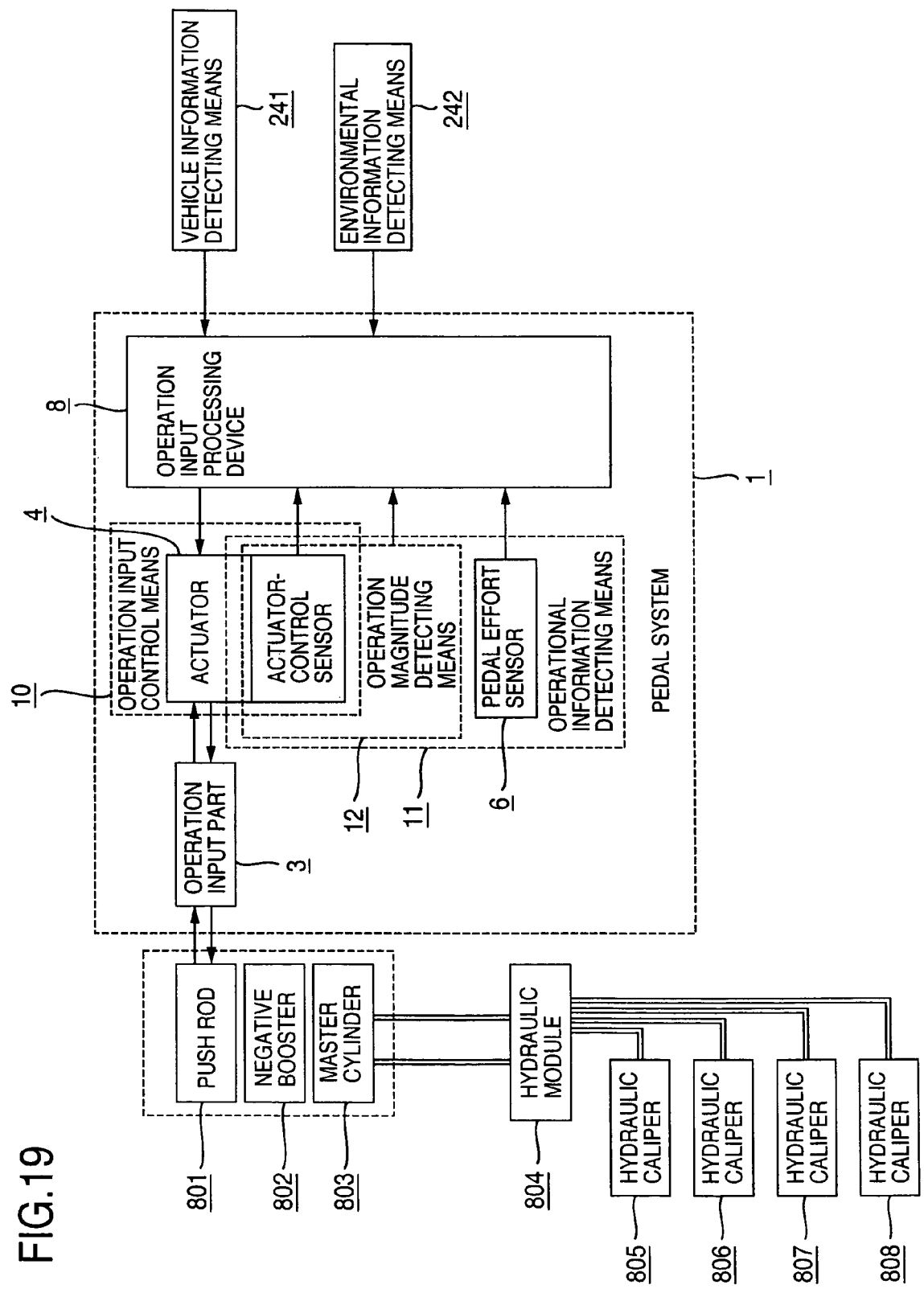
FIG. 19 is a block diagram of the system showing an example of structure of the embodiment 2.

FIG. 18 is a schematic view showing a system that constitutes an embodiment 2. FIG. 19 is a block diagram of the system that constitutes the invention. That portion of the invention illustrated in the embodiment 1, which concerns a pedal reaction force, is likewise applicable to the construction shown in FIG. 18.

The reference numeral 1 denotes a pedal system, which a driver manipulates in order to operate a vehicle, and which includes an actuator 4 to be able to electrically control a pedal travel or a pedal reaction force. The pedal system 1 causes a pedal travel to travel according to an operation force or a pedal effort applied to an operation input part 3 to create a pedal reaction force corresponding to the pedal travel. The relationship between a pedal travel and a pedal reaction force, or a pedal effort can be set arbitrarily by electric control.

The reference numerals 805 to 808 denote braking output devices that brake a vehicle to decelerate the same. The reference numerals 805 to 808 denote hydraulic calipers that hydraulically push a piston against a rotor to brake and decelerate a vehicle with a friction material. Here, the pedal system and the braking output devices are connected to each other through mechanical connection or hydraulic piping, and exchange of electric signals is not made between the pedal system and the braking output devices. An operation input into the pedal system is boosted through a push rod 801 by a negative pressure booster 802 and converted into hydraulic pressure by a master cylinder 803. Hydraulic pressure created by the master cylinder 803 reaches a hydraulic module 804 through a pipe to be distributed by the hydraulic module 804 to be transmitted to the hydraulic calipers 805 to 808.

In the embodiment 2, the relationship between a pedal travel and a braking force is determined by mechanical conditions while the relationship between a pedal travel and a reaction force and between a pedal effort and a braking force is made variable by electrically controlling the pedal system. The fundamental system of the invention illustrated in the embodiment 1 does not make it essential to make the relationship of a braking force with a pedal travel variable. Therefore, the fundamental system of the invention is applicable to the embodiment 2. Accordingly, even with conventional vehicles not relying on the bi-wire technique, only the use of the pedal system 1 makes it possible to apply the fundamental system of the invention to get its main effect.

Figure 20:
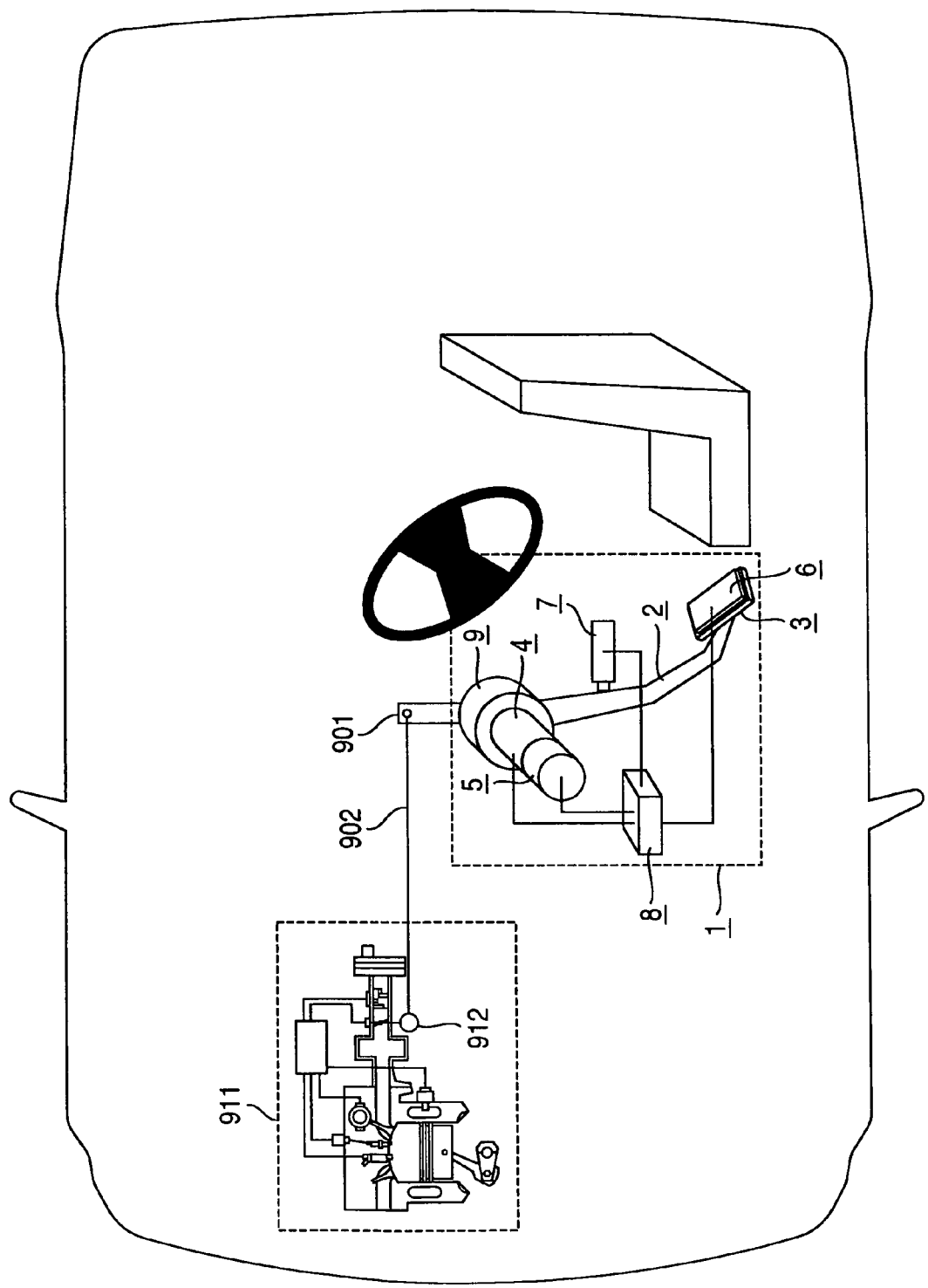
FIG. 20 is a schematic view of a system showing an example of structure of an embodiment 3.
Figure 21:
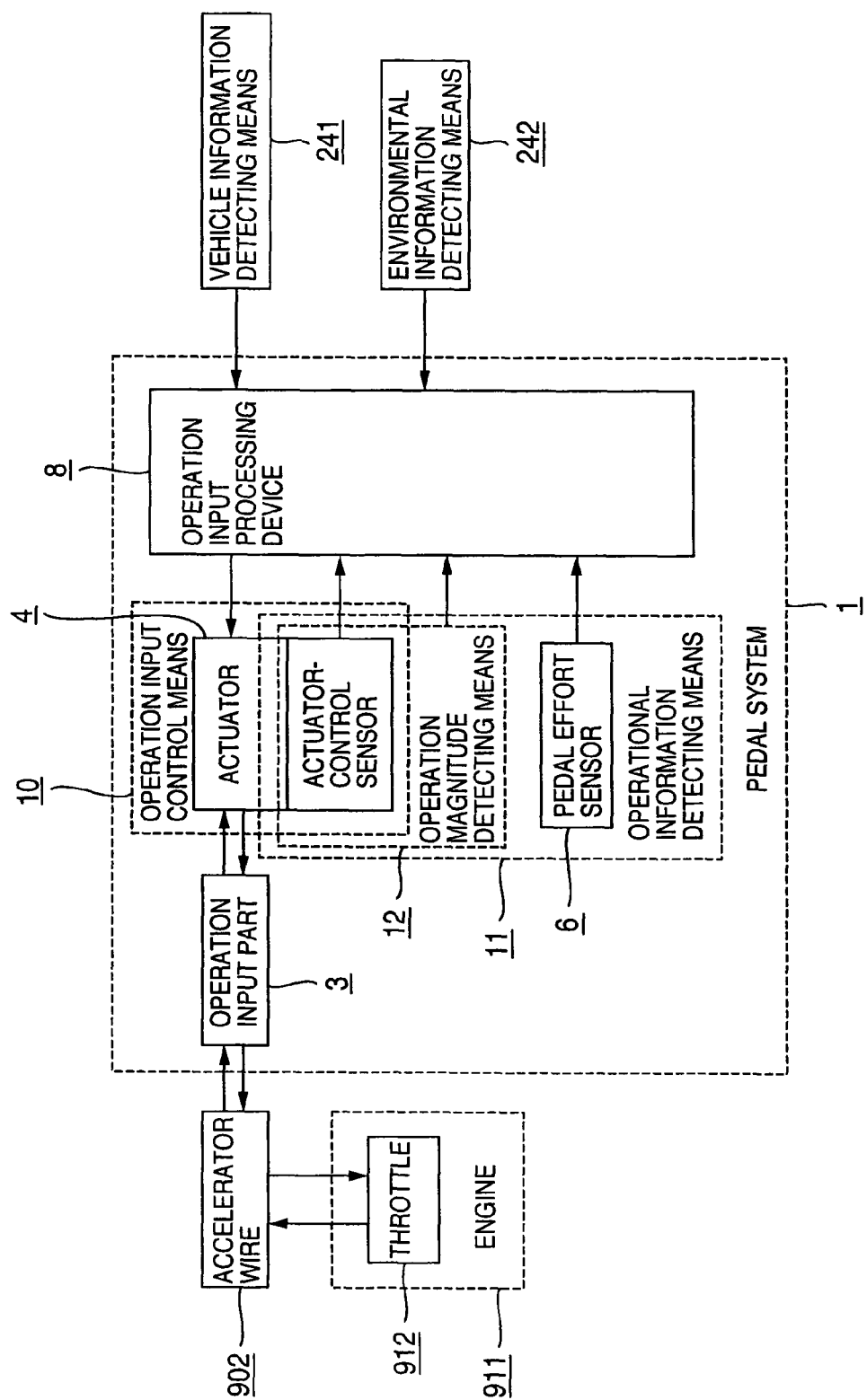
FIG. 21 is a block diagram of the system showing an example of structure of the embodiment 3.

FIG. 20 is a schematic view showing a system that constitutes an embodiment 3. FIG. 21 is a block diagram of the system that constitutes the invention. That portion of the invention illustrated in the embodiment 1, which concerns a pedal reaction force, is likewise applicable to the construction shown in FIG. 20.

The reference numeral 1 denotes a pedal system, which a driver manipulates in order to operate a vehicle, and which includes an actuator 4 to be able to electrically control a pedal travel or a pedal reaction force. The pedal system 1 causes a pedal travel to travel according to an operation force or a pedal effort applied to an operation input part 3 to create a pedal reaction force corresponding to the pedal travel. The relationship between a pedal travel and a pedal reaction force, or a pedal effort can be set arbitrarily by electric control.

The reference numeral 911 denotes a driving output device that drives and accelerates a vehicle. The reference numeral 911 denotes an engine that drives and accelerates a vehicle with gasoline or light oil as a fuel. Here, the pedal system and the driving output device are connected to each other through mechanical connection or an accelerator wire, and exchange of electric signals is not made between the pedal system and the driving output device. An operation input into the pedal system operates a throttle opening degree of a throttle 912 through an accelerator wire 902 connected to a member 901, and the engine 911 drives a vehicle according to the throttle opening degree of the throttle 912.

In the embodiment 3, the relationship between a pedal travel and a driving force is determined by mechanical conditions while the relationship between a pedal travel and a reaction force and between a pedal effort and a driving force is made variable by electrically controlling the pedal system. The fundamental system of the invention illustrated in the embodiment 1 does not make it essential to make the relationship of a driving force with a pedal travel variable. Therefore, the fundamental system of the invention is applicable to the embodiment 3. Accordingly, even with conventional vehicles not relying on the bi-wire technique, only the use of the pedal system 1 makes it possible to apply the fundamental system of the invention to get its main effect.

As described above, according to the invention, a pedal and the kinematical performance of a vehicle, which correspond to vehicle information and environmental information, are realized without giving a sense of incongruity to a driver whereby it is possible to provide a pedal system, which involves easiness of operation, less susceptibility to fatigue, and a good feeling of driving.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A pedal system comprising:
a pedal,
an actuator for electrically controlling pedal travel, pedal speed, or pedal reaction force, and
operation force detecting means that simultaneously detects both a pedal effort applied by a driver in order to move the pedal and a pedal reaction force from the pedal,
wherein the pedal system includes at least two kinds of thresholds that vary according to stepping on the pedal, and
characteristics between pedal travel and said pedal reaction force are changed in accordance with said pedal effort irrespective of an activation direction of said pedal when the pedal effort is larger than a larger of the thresholds, when the pedal effort is smaller than a smaller of the thresholds, and when the pedal effort is between the larger and smaller thresholds.

2. A pedal system according to claim 1, wherein when the pedal effort is larger than the larger threshold, the larger threshold corresponds to a pedal reaction force, and when the pedal effort is smaller than the smaller threshold, the smaller threshold corresponds to a pedal reaction force.

3. A pedal system according to claim 1, wherein when the pedal effort is between the larger threshold and the smaller threshold, a change in pedal travel is prevented irrespective of the pedal effort.

4. A pedal system according to claim 1, wherein when the pedal effort is between the larger threshold and the smaller threshold, the pedal travel is changed according to the pedal effort.

5. A pedal system according to claim 1, wherein when the pedal effort is between the larger threshold and the smaller threshold, a gradient of the pedal reaction force or the pedal effort relative to the pedal travel is larger than a gradient of the larger threshold.

6. A pedal system according to claim 1, wherein when the pedal effort is between the larger threshold and the smaller threshold, a gradient of the pedal reaction force or the pedal effort relative to the pedal travel is larger than a gradient of the smaller threshold.

7. A pedal system according to claim 1, wherein characteristics of the pedal reaction force or a vehicle output during a pedal releasing motion are varied according to a speed or an acceleration of a vehicle.

8. A pedal system according to claim 1, wherein characteristics of the pedal reaction force or a vehicle output during a pedal releasing motion are varied depending upon whether a vehicle is traveling.

9. A pedal system according to claim 1, wherein characteristics of the pedal reaction force or a vehicle output during a pedal releasing motion are varied according to a gradient of a road on which a vehicle including the pedal system travels.

10. A pedal system according to claim 1, wherein characteristics of the pedal reaction force or a vehicle output during a pedal releasing motion are varied according to a relationship with a preceding vehicle or an obstacle.

11. A pedal system according to claim 1, wherein the pedal comprises a brake pedal or an accelerator pedal.

12. A pedal system according to claim 1, wherein said characteristics are changed so as to provide a first relationship between the pedal travel and the pedal reaction force when the pedal effort is larger than the larger of the thresholds, a second relationship between the pedal travel and the pedal reaction force when the pedal effort is smaller than the smaller of the thresholds, and a third relationship between the pedal travel and the pedal reaction force when the pedal effort is in between the larger and smaller thresholds.

13. A pedal system comprising:
   a pedal,
   an actuator for electrically controlling pedal travel, pedal speed, or pedal effort, and
   operation force detecting means that simultaneously detects both a pedal effort applied by a driver in order to move the pedal and a pedal reaction force from the pedal,
   wherein the pedal system includes at least two kinds of thresholds that vary according to stepping on the pedal, and
   characteristics between pedal travel and a vehicle output are changed in accordance with said pedal effort irrespective of an actuation direction of said pedal when the pedal effort is larger than a larger of the thresholds, when the pedal effort is smaller than a smaller of the thresholds, and when the pedal effort is between the larger and smaller thresholds.

14. A pedal system according to claim 13, wherein when the pedal effort is larger than the larger threshold, the larger threshold corresponds to a pedal reaction force, and when the pedal effort is smaller than the smaller threshold, the smaller threshold corresponds to a pedal reaction force.

15. A pedal system according to claim 13, wherein when the pedal effort is between the larger threshold and the smaller threshold, a change in pedal travel is prevented irrespective of a pedal effort.

16. A pedal system according to claim 13, wherein when the pedal effort is between the larger threshold and the smaller threshold, the pedal travel is changed according to the pedal effort.

17. A pedal system according to claim 13, wherein when the pedal effort is between the larger threshold and the smaller threshold, a gradient of the pedal reaction force or the pedal effort relative to the pedal travel is larger than a gradient of the larger threshold.

18. A pedal system according to claim 13, wherein when the pedal effort is between the larger threshold and the smaller threshold, a gradient of the pedal reaction force or the pedal effort relative to the pedal travel is larger than a gradient of the smaller threshold.

19. A pedal system according to claim 13, wherein characteristics of the pedal reaction force or a vehicle output during a pedal releasing motion are varied according to a speed or an acceleration of a vehicle.

20. A pedal system according to claim 13, wherein characteristics of the pedal reaction force or a vehicle output during a pedal releasing motion are varied depending upon whether a vehicle is traveling.

21. A pedal system according to claim 13, wherein characteristics of the pedal reaction force or a vehicle output during a pedal releasing motion are varied according to a gradient of a road on which a vehicle including the pedal system travels.

22. A pedal system according to claim 13, wherein characteristics of the pedal reaction force or a vehicle output during a pedal releasing motion are varied according to a relationship with a preceding vehicle or an obstacle.

23. A pedal system according to claim 13, wherein the pedal comprises a brake pedal or an accelerator pedal.

24. A pedal system according to claim 13, wherein said characteristics are changed so as to provide a first relationship between the pedal travel and the vehicle output when the pedal effort is larger than the larger of the thresholds, a second relationship between the pedal travel and the vehicle output when the pedal effort is smaller than the smaller of the thresholds, and a third relationship between the pedal travel and the vehicle output when the pedal effort is in between the larger and smaller thresholds.

25. A vehicle comprising:
   a pedal,
   an actuator for electrically controlling pedal travel, pedal speed, or pedal effort, and
   operation force detecting means that simultaneously detects both a pedal effort applied by a driver in order to move the pedal and a pedal reaction force from the pedal,
   wherein the pedal system includes at least two kinds of thresholds that vary according to stepping on the pedal, and
   characteristics between pedal travel and said pedal reaction force are changed in accordance with said pedal effort irrespective of an actuation direction of said pedal when the pedal effort is larger than a larger of the thresholds, when the pedal effort is smaller than a smaller of the thresholds, and when the pedal effort is between the larger and smaller thresholds.

26. A vehicle according to claim 25, wherein when a pedal effort is larger than the larger threshold, the larger threshold corresponds to a pedal reaction force, and when a pedal effort is smaller than the smaller threshold, the smaller threshold corresponds to a pedal reaction force.

27. A vehicle according to claim 25, wherein when the pedal effort is between the larger threshold and the smaller threshold, a change in pedal travel is prevented irrespective of a pedal effort.

28. A vehicle according to claim 25, wherein when the pedal effort is between the larger threshold and the smaller threshold, the a pedal travel is changed according to the pedal effort.

29. A vehicle according to claim 25, wherein when the pedal effort is between the larger threshold and the smaller threshold, a gradient of the pedal reaction force or the pedal effort relative to the pedal travel is larger than a gradient of the larger threshold.

30. A vehicle according to claim 25, wherein when the pedal effort is between the larger threshold and the smaller threshold, a gradient of the pedal reaction force or the pedal effort relative to the pedal travel is larger than a gradient of the smaller threshold.

31. A vehicle according to claim 25, wherein characteristics of the pedal reaction force or a vehicle output during a pedal releasing motion are varied according to a speed or an acceleration of the vehicle.

32. A vehicle according to claim 25, wherein characteristics of the pedal reaction force or a vehicle output during a pedal releasing motion are varied depending upon whether the vehicle is traveling.

33. A vehicle according to claim 25, wherein characteristics of the pedal reaction force or a vehicle output during a pedal releasing motion are varied according to a gradient of a road on which the vehicle including the pedal system travels.

34. A vehicle according to claim 25, wherein characteristics of the pedal reaction force or a vehicle output during a pedal releasing motion are varied according to a relationship with a preceding vehicle or an obstacle.

35. A vehicle according to claim 25, wherein the pedal comprises a brake pedal or an accelerator pedal.

36. A vehicle according to claim 25, wherein said characteristics are changed so as to provide a first relationship between the pedal travel and the pedal reaction force when the pedal effort is larger than the larger of the thresholds, a second relationship between the pedal travel and the pedal reaction force when the pedal effort is smaller than the smaller of the thresholds, and a third relationship between the pedal travel and the pedal reaction force when the pedal effort is in between the larger and smaller thresholds.

37. A vehicle comprising:
   a pedal,
   an actuator for electrically controlling pedal travel, pedal speed, or pedal effort, and
   operation force detecting means that simultaneously detects both a pedal effort applied by a driver in order to move the pedal and a pedal reaction force from the pedal,
   wherein the vehicle includes at least two kinds of thresholds that vary according to stepping on the pedal, and
   characteristics between the pedal travel and a vehicle output are changed in accordance with said travel effort irrespective of an actuation direction of the pedal when the pedal effort is larger than a larger of the thresholds, when the pedal effort is smaller than a smaller of the thresholds, and when the pedal effort is between the larger and smaller thresholds.

38. A vehicle according to claim 37, wherein said characteristics are changed so as to provide a first relationship between the pedal travel and the vehicle output when the pedal effort is larger than the larger of the thresholds, a second relationship between the pedal travel and the vehicle output when the pedal effort is smaller than the smaller of the thresholds, and a third relationship between the pedal travel and the vehicle output when the pedal effort is in between the larger and smaller thresholds.

\* \* \* \* \*